US012689845B2

(12) United States Patent　　(10) Patent No.:　US 12,689,845 B2
Takado　　(45) Date of Patent:　　Jul. 21, 2026

(54) PHOTOELECTRIC CONVERSION DEVICE AND LIGHT DETECTION SYSTEM

(71) Applicant: CANON KABUSHIKI KAISHA, Tokyo (JP)

(72) Inventor: Hisashi Takado, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 55 days.

(21) Appl. No.: 18/985,565

(22) Filed: Dec. 18, 2024

(65) Prior Publication Data

US 2025/0227393 A1　　Jul. 10, 2025

(30) Foreign Application Priority Data

Jan. 5, 2024　(JP) ................................ 2024-000747

(51) Int. Cl.
　H04N 25/773　　(2023.01)
　H04N 25/443　　(2023.01)
　H04N 25/47　　(2023.01)
　H04N 25/50　　(2023.01)

(52) U.S. Cl.
　CPC ......... H04N 25/773 (2023.01); H04N 25/443 (2023.01); H04N 25/47 (2023.01); *H04N 25/50* (2023.01)

(58) Field of Classification Search
　None
　See application file for complete search history.

(56) References Cited

U.S. PATENT DOCUMENTS

| | | |
|---|---|---|
| 9,900,532 B2 | 2/2018 | Takado |
| 9,900,535 B2 | 2/2018 | Takado |
| 9,912,886 B2 | 3/2018 | Shigeta |
| 10,044,992 B2 | 8/2018 | Takado |
| 10,122,951 B2 | 11/2018 | Takado |
| 10,244,192 B2 | 3/2019 | Shigeta |
| 10,477,165 B2 | 11/2019 | Takado |
| 10,645,325 B2 | 5/2020 | Takado |
| 10,979,647 B2 | 4/2021 | Takado |

(Continued)

FOREIGN PATENT DOCUMENTS

| | | |
|---|---|---|
| JP | 2019-17065 A | 1/2019 |
| JP | 2020-155886 A | 9/2020 |

(Continued)

*Primary Examiner* — Paul M Berardesca
(74) *Attorney, Agent, or Firm* — VENABLE LLP

(57)　　ABSTRACT

A photoelectric conversion device includes a plurality of pixels each including a photoelectric conversion unit, a counting unit configured to hold a count value in a predetermined number of bits, and a switching unit configured to switch information output from the counting unit to first information including information of an upper bit or second information including information of the upper bit and another bit among the predetermined number of bits held by the counting unit; a detection unit configured to extract a detection pixel that outputs the second information from among the plurality of pixels based on the first information; and a region control unit configured to control the switching unit of each pixel based on a detection result from the detection unit, wherein the region control unit causes the counting unit of the detection pixel and an adjacent pixel adjacent to the detection pixel to output the second information.

15 Claims, 25 Drawing Sheets

(56)        References Cited

U.S. PATENT DOCUMENTS

| | | | |
|---|---|---|---|
| 11,057,582 B2 | 7/2021 | Takado | |
| 11,159,759 B2 | 10/2021 | Takado | |
| 11,284,023 B2 | 3/2022 | Yamanaka | |
| 11,297,273 B2 | 4/2022 | Sekine | |
| 11,418,733 B2 | 8/2022 | Takado | |
| 2017/0187939 A1* | 6/2017 | Kasuga | H04N 25/77 |
| 2020/0304745 A1 | 9/2020 | Sato | |
| 2022/0412797 A1 | 12/2022 | Yamashita | |
| 2023/0224609 A1* | 7/2023 | Hikosaka | H04N 25/583 |
| | | | 348/294 |
| 2024/0098381 A1 | 3/2024 | Takado | |
| 2024/0388816 A1 | 11/2024 | Takado | |
| 2024/0397234 A1* | 11/2024 | Takatsuka | H04N 25/773 |
| 2025/0324177 A1* | 10/2025 | Ikeda | H04N 23/55 |
| 2025/0373959 A1* | 12/2025 | Otaka | H04N 25/773 |

FOREIGN PATENT DOCUMENTS

| | | | | |
|---|---|---|---|---|
| JP | 2021-93583 A | 6/2021 | | |
| JP | 2023-4679 A | 1/2023 | | |
| WO | WO-2025084113 A1 * | 4/2025 | | H04N 25/773 |
| WO | WO-2025177720 A1 * | 8/2025 | | H04N 25/773 |
| WO | WO-2025261980 A1 * | 12/2025 | | H04N 25/773 |

* cited by examiner

CNT[10]

CNT[10]_d

TRG t1

Figure 19:
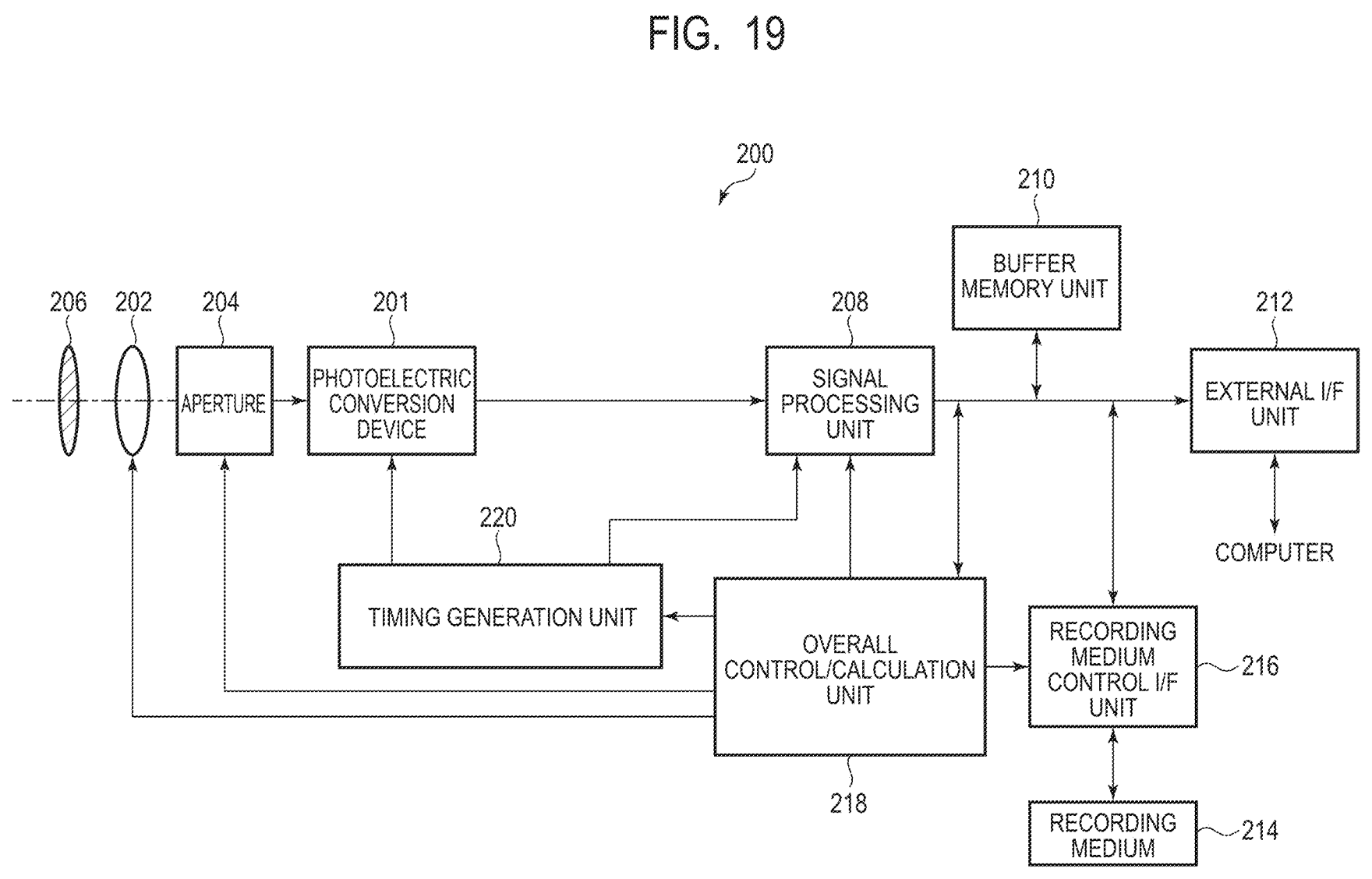

204 APERTURE

201 PHOTOELECTRIC CONVERSION DEVICE

208 SIGNAL PROCESSING UNIT

210 BUFFER MEMORY UNIT

212 EXTERNAL I/F UNIT

COMPUTER

220 TIMING GENERATION UNIT

218 OVERALL CONTROL/CALCULATION UNIT

216 RECORDING MEDIUM CONTROL I/F UNIT

214 RECORDING MEDIUM

Figure 20:
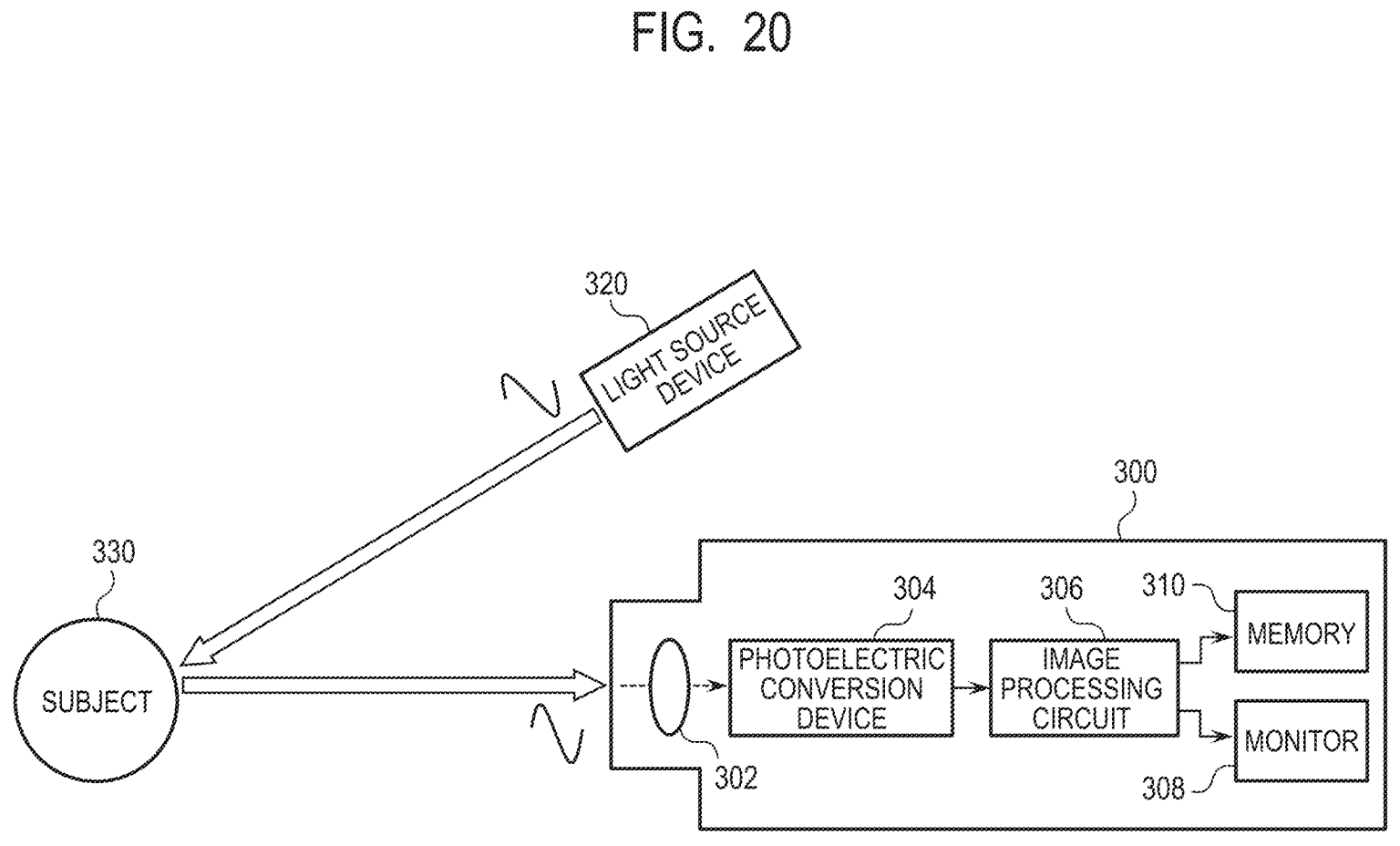

310 MEMORY

308 MONITOR

306 IMAGE PROCESSING CIRCUIT

304 PHOTOELECTRIC CONVERSION DEVICE

302

320 LIGHT SOURCE DEVICE

330 SUBJECT

PHOTOELECTRIC CONVERSION DEVICE AND LIGHT DETECTION SYSTEM

BACKGROUND

Technical Field

The present disclosure relates to a photoelectric conversion device and a light detection system.

Description of the Related Art

In recent years, a photon counting type image sensor has been proposed in which the number of photons incident on a photodiode during an exposure period is counted and the counted value is output as a signal value. Japanese Patent Application Laid-Open No. 2019-017065 discloses an imaging device using an avalanche photodiode (APD). This imaging device reads only signals of pixels whose difference between a previous frame and a current frame exceeds a threshold.

SUMMARY

However, the imaging device described in Japanese Patent Application Laid-Open No. 2019-017065 can improve a readout speed, but has a problem in that output accuracy of a signal decreases because the signal in a region where readout is not performed is lost.

Therefore, an object of a present disclosure is to provide a photoelectric conversion device and a light detection system capable of improving readout speed without lowering output accuracy of a signal.

According to one disclosure of the present specification, there is provided a photoelectric conversion device including a plurality of pixels each including a photoelectric conversion unit configured to output a photon detection signal according to incidence of a photon, a counting unit configured to hold a count value obtained by counting the photon detection signal in a predetermined number of bits, and a switching unit configured to switch information output from the counting unit to first information including information of an upper bit or second information including information of the upper bit and another bit among the predetermined number of bits held by the counting unit; a detection unit configured to extract a detection pixel that outputs the second information from among the plurality of pixels based on the first information.

Further features of the present invention will become apparent from the following description of exemplary embodiments with reference to the attached drawings.

BRIEF DESCRIPTION OF THE DRAWINGS

FIG. 8 is a diagram illustrating a first operation example of the region control unit of the photoelectric conversion device according to the first embodiment of the present disclosure.

FIG. 10 is a diagram illustrating a third operation example of the region control unit of the photoelectric conversion device according to the first embodiment of the present disclosure.

FIG. 12 is a timing chart illustrating a second operation example of the photoelectric conversion device according to the first embodiment of the present disclosure.

FIG. 17 is a diagram illustrating an operation example of an edge trigger circuit of the photoelectric conversion device according to the third embodiment of the present disclosure.

FIG. 19 is a block diagram illustrating a schematic configuration of a light detection system according to a fourth embodiment of the present disclosure.

FIG. 20 is a block diagram illustrating a schematic configuration of a range image sensor according to a fifth embodiment of the present disclosure.

DESCRIPTION OF THE EMBODIMENTS

Figure 1:
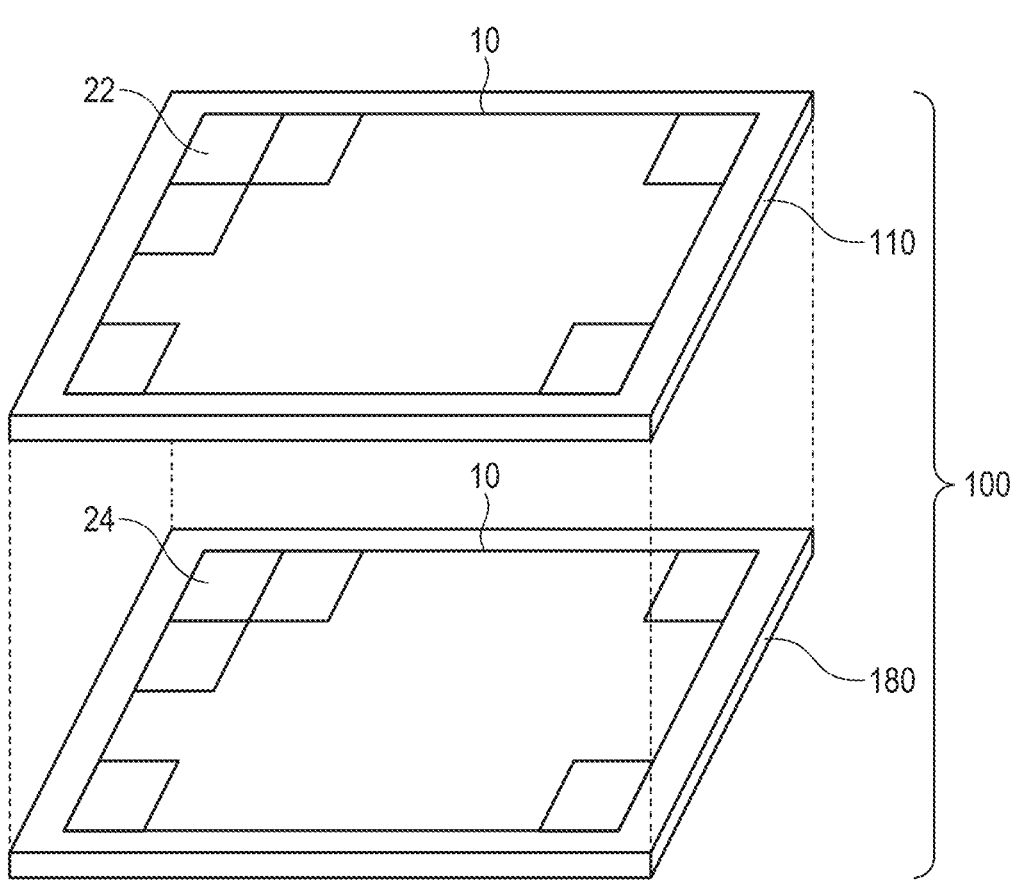
FIG. 1 is a perspective view illustrating a configuration example of a photoelectric conversion device according to a first embodiment of the present disclosure.

The following embodiments are intended to embody a technical idea of the present disclosure, and do not limit the present disclosure. The sizes and positional relationships of members illustrated in the drawings may be exaggerated for clarity of description. In the following description, the same components are denoted by the same reference numerals, and the description thereof may be omitted.

First Embodiment

Figure 2:
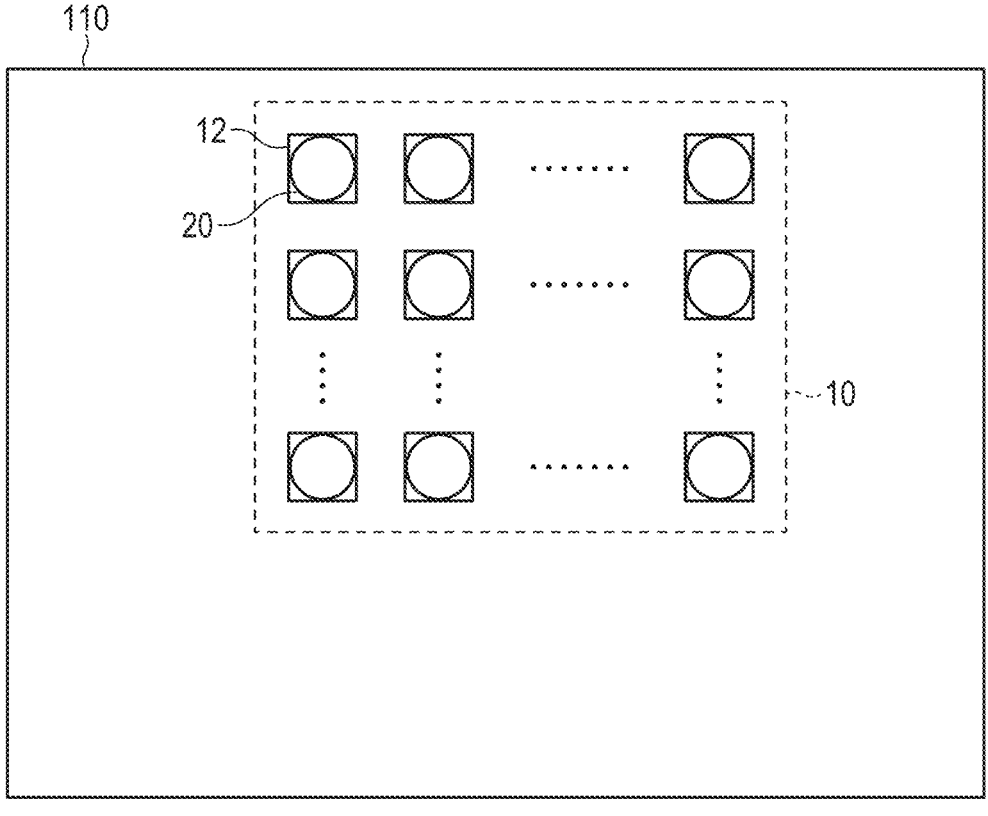
FIG. 2 is a plan view illustrating a schematic configuration of a sensor substrate of the photoelectric conversion device according to the first embodiment of the present disclosure.
Figure 3:
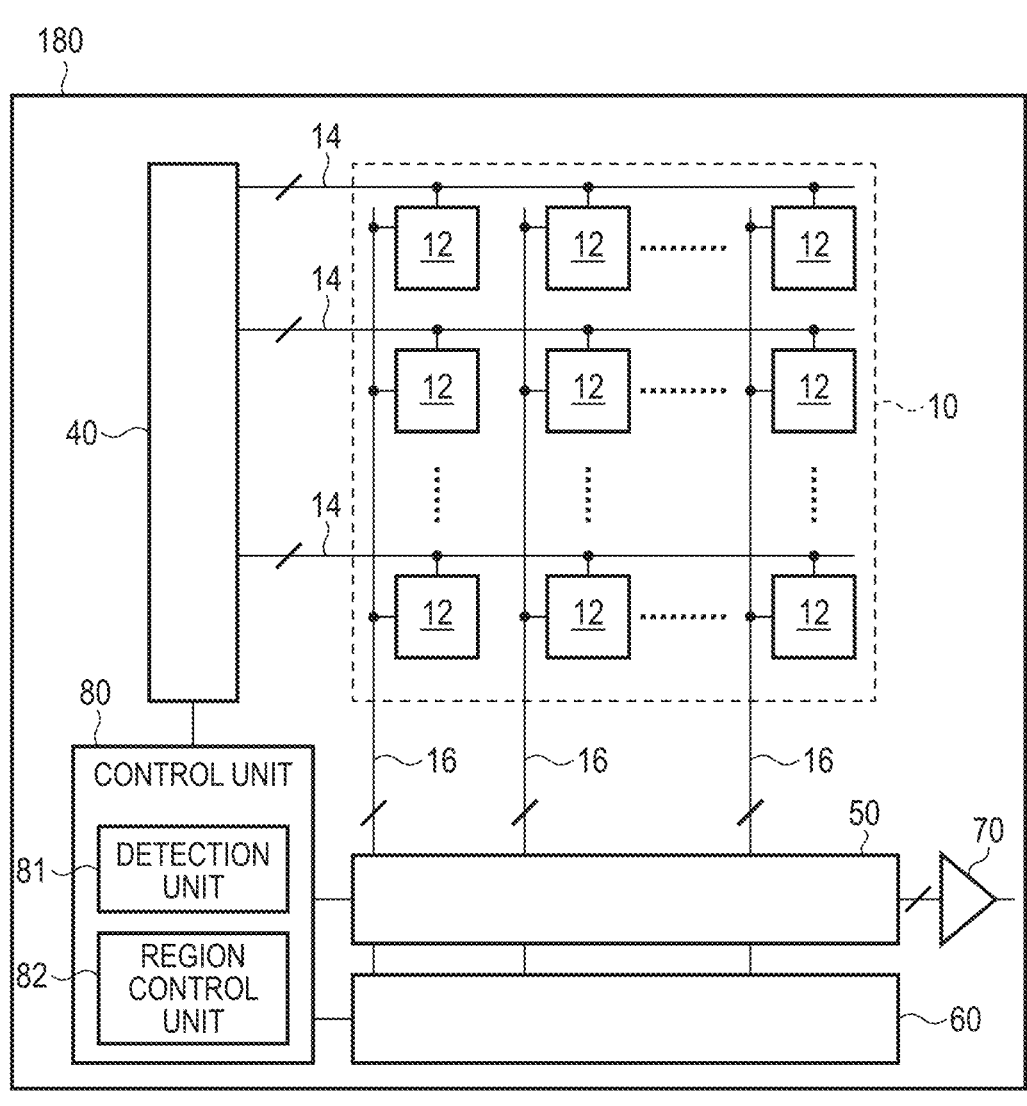
FIG. 3 is a block diagram illustrating a schematic configuration of a circuit substrate of the photoelectric conversion device according to the first embodiment of the present disclosure.
Figure 4:
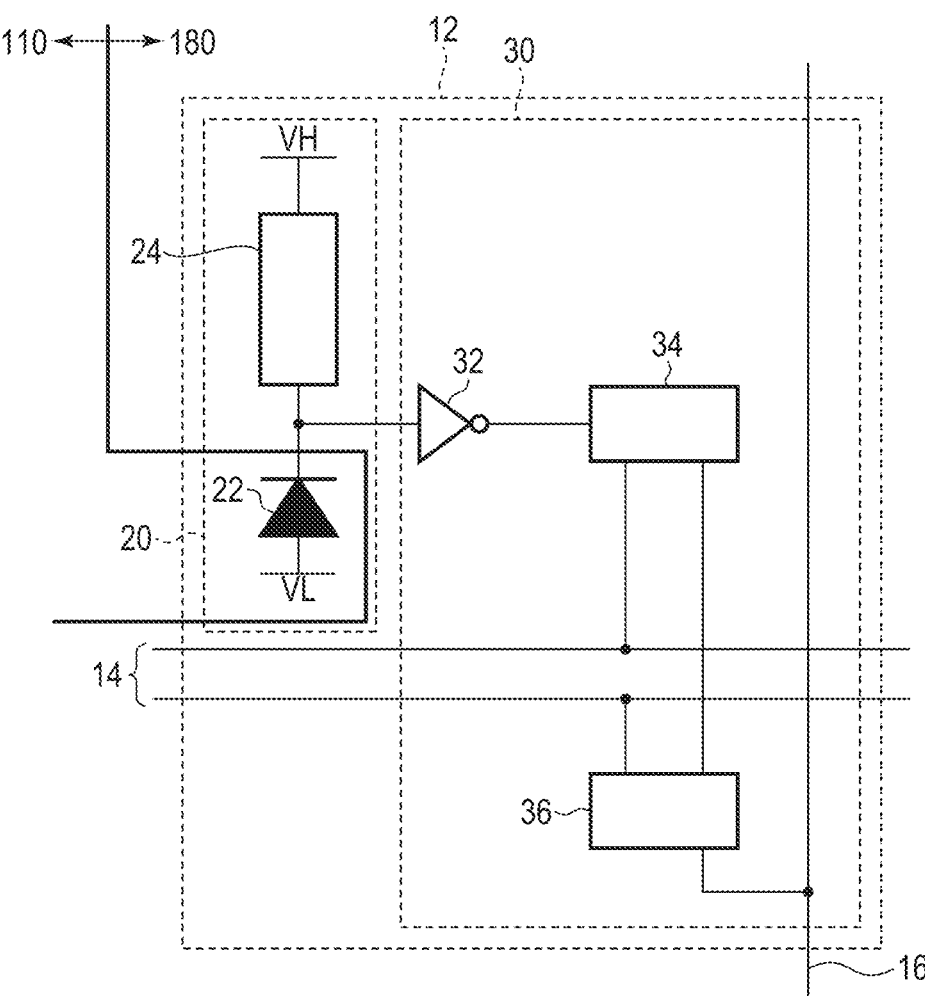
FIG. 4 is a block diagram illustrating a configuration example of a pixel of the photoelectric conversion device according to the first embodiment of the present disclosure.
Figure 5A:
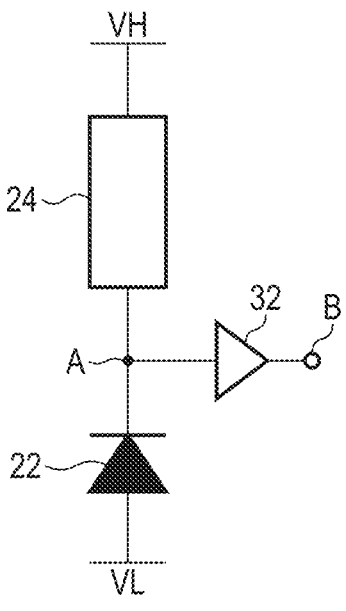
FIGS. 5A and 5B are diagrams illustrating a basic operation of the photoelectric conversion unit of the photoelectric conversion device according to the first embodiment of the present disclosure.
Figure 5B:
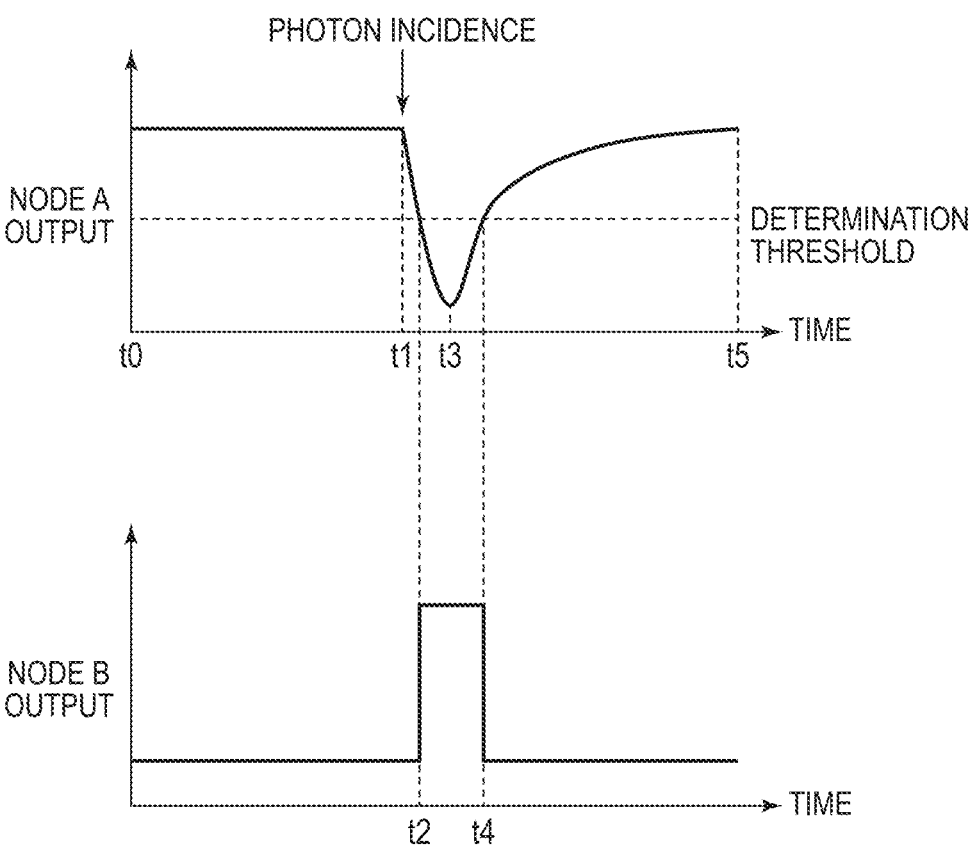

A schematic configuration and a basic operation of a photoelectric conversion device according to a first embodiment of the present disclosure will be described with reference to FIGS. 1 to 5B. FIG. 1 is a perspective view illustrating a configuration example of a photoelectric conversion device according to the present embodiment. FIG. 2 is a plan view illustrating a schematic configuration of a sensor substrate of the photoelectric conversion device according to the present embodiment. FIG. 3 is a block diagram illustrating a configuration example of a circuit substrate of the photoelectric conversion device according to the present embodiment. FIG. 4 is a block diagram illustrating a configuration example of a pixel of the photoelectric conversion device according to the present embodiment. FIGS. 5A and 5B are diagrams illustrating a basic operation of the photoelectric conversion unit of the photoelectric conversion device according to the present embodiment.

As illustrated in FIGS. 1 to 3, the photoelectric conversion device 100 according to the present embodiment includes a pixel region 10, a vertical scanning circuit unit 40, a readout circuit unit 50, a horizontal scanning circuit unit 60, an output circuit unit 70, and a control unit 80.

In the pixel region 10, a plurality of pixels 12 are provided and arranged in an array so as to form a plurality of rows and a plurality of columns. As described later, each pixel 12 may include a photoelectric conversion unit including a photoelectric conversion element and a pixel signal processing unit that processes a signal output from the photoelectric conversion unit. The number of pixels 12 constituting the pixel region 10 is not particularly limited. For example, like a general digital camera, the pixel region 10 may include a plurality of pixels 12 arranged in an array of several thousand rows and columns. Alternatively, the pixel region 10 may include a plurality of pixels 12 arranged in one row or one column. Alternatively, the pixel region 10 may include one pixel 12.

In each row of the pixel array of the pixel region 10, control lines 14 are arranged so as to extend in a first direction (lateral direction in FIG. 1). The control line 14 is connected to each of the pixels 12 arranged in the first direction and forms a common signal line for the pixels 12. The first direction in which the control line 14 extends may be referred to as a row direction or a horizontal direction. Each of the control lines 14 may include a plurality of signal lines for supplying a plurality of types of control signals to the pixels 12. The control line 14 of each row is connected to the vertical scanning circuit unit 40.

Further, in each column of the pixel array of the pixel region 10, data lines 16 are arranged so as to extend in a second direction (vertical direction in FIG. 1) intersecting the first direction. The data line 16 is connected to each of the pixels 12 arranged in the second direction and forms a common signal line for the pixels 12. The second direction in which the data line 16 extends may be referred to as a column direction or a vertical direction. Each of the data lines 16 may include a plurality of signal lines for transferring a digital signal of a plurality of bits output from the pixel 12 on a bit-by-bit basis. The data line 16 of each column is connected to the readout circuit unit 50.

The vertical scanning circuit unit 40 receives a control signal output from the control unit 80, generates a control signal for driving the pixels 12, and supplies the control signal to the pixels 12 via the control line 14. A logic circuit such as a shift register or an address decoder may be used as the vertical scanning circuit unit 40. The vertical scanning circuit unit 40 sequentially scans the pixels 12 in the pixel region 10 in units of rows and causes the pixels 12 to sequentially output the pixel signal to the readout circuit unit 50 via the data lines 16.

The readout circuit unit 50 includes a plurality of holding units (not illustrated) provided corresponding to each column of the pixel array of the pixel region 10. The readout circuit unit 50 holds the pixel signals of the pixels 12 of each column output in units of rows from the pixel region 10 via the data lines 16 in the holding units of the corresponding columns. The readout circuit unit 50 outputs the pixel signal to the output circuit unit 70 and a detection unit 81 described later.

The horizontal scanning circuit unit 60 is receives a control signal output from the control unit 80, generates a control signal for reading out a pixel signal from the holding unit of each column of the readout circuit unit 50, and supplies the control signal to the readout circuit unit 50. A logic circuit such as a shift register or an address decoder may be used as the horizontal scanning circuit unit 60. The horizontal scanning circuit unit 60 sequentially scans the holding units of each column of the readout circuit unit 50, causes the readout circuit unit 50 to sequentially output the pixel signals held in the holding units to the output circuit unit 70 or the detection unit 81.

The output circuit unit 70 includes an external interface circuit, and outputs the pixel signal output from the readout circuit unit 50 to an outside of the photoelectric conversion device 100. The external interface circuit included in the output circuit unit 70 is not particularly limited. A SerDes (SERializer/DESerializer) transmission circuit is applicable to the external interface circuit. The SerDes transmission circuit is, for example, a LVDS (Low Voltage Differential Signaling) circuit, a SLVS (Scalable Low Voltage Signaling) circuit, or the like.

The control unit 80 generates control signals for controlling the operations and timings of the vertical scanning circuit unit 40, the readout circuit unit 50, and the horizontal scanning circuit unit 60, and supplies the control signals to the functional blocks. At least a part of the control signals for controlling the operations and timings of the vertical scanning circuit unit 40, the readout circuit unit 50, and the horizontal scanning circuit unit 60 may be supplied from the outside of the photoelectric conversion device 100. The control unit 80 includes various electronic components such as a CPU and a memory, and includes the detection unit 81 and a region control unit 82.

The detection unit 81 detects the pixel 12 to which the pixel signal is to be output to the readout circuit unit 50 from among the pixels 12 based on the pixel signal output from the pixels 12. The detection unit 81 outputs detection information indicating the detected pixel 12 to the region control unit 82.

The region control unit 82 controls a region that outputs the pixel signal to the readout circuit unit 50 in the pixel region 10 based on the detection information output from the detection unit 81. The region control unit 82 outputs a control signal indicating the region to which the pixel signal is to be output in the pixel region 10 to the vertical scanning circuit unit 40 and the horizontal scanning circuit unit 60.

Each of the pixels 12 may include, for example, a photoelectric conversion unit 20 and a pixel signal processing unit 30 as illustrated in FIG. 4. The photoelectric conversion unit 20 outputs a photon detection signal according to incidence of a photon, and may include, for example, a photoelectric conversion element 22 and a quenching element 24. The pixel signal processing unit 30 may include, for example, a waveform shaping unit 32, a counter circuit 34 as a counting unit, and a selection circuit 36 as a switching unit.

The photoelectric conversion element 22 may be an avalanche photodiode (hereinafter referred to as "APD"). An anode of the APD constituting the photoelectric conversion element 22 is connected to a node to which the voltage VL is supplied. The cathode of the APD constituting the photoelectric conversion element 22 is connected to one terminal of the quenching element 24. A connection node between the photoelectric conversion element 22 and the quenching element 24 is an output node of the photoelectric conversion unit 20. The other terminal of the quenching element 24 is connected to a node to which a voltage VH higher than the voltage VL is supplied. The voltage VL and the voltage VH are set so that a reverse bias voltage sufficient for the APD to perform the avalanche multiplication operation is applied. In one example, a negative high voltage is applied as the voltage VL, and a positive voltage comparable to the power supply voltage is applied as the voltage VH. In one example, the voltage VL may be −30 V, and the voltage VH may be 3 V, but from the viewpoint of improvement in element characteristics, suppression of deterioration, and the like, it is desired to lower the drive voltage of the APD.

The photoelectric conversion element 22 may be configured by an APD as described above. When the reverse bias voltage sufficient to perform the avalanche multiplication operation is supplied to the APD, charges generated by light incident on the APD cause avalanche multiplication, and an avalanche current is generated. The operation modes in a state where the reverse bias voltage is supplied to the APD include a Geiger mode and a linear mode. The Geiger mode is an operation mode in which a voltage applied between the anode and the cathode is set to a reverse bias voltage larger than a breakdown voltage of the APD. The linear mode is an operation mode in which the voltage applied between the anode and the cathode is set to a reverse bias voltage close to or lower than the breakdown voltage of the APD. The APD that operates in Geiger mode is referred to as SPAD (Single Photon Avalanche Diode). The APD constituting the photoelectric conversion element 22 may operate in the linear mode or the Geiger mode.

In the present embodiment, the anode of the APD is set to a fixed potential, and a signal is extracted from the cathode side. That is, a semiconductor region of the first conductivity type, which has majority carriers of the same polarity as a signal charge, is an N-type semiconductor region. A semiconductor region of the second conductivity type, which has majority carriers of the opposite polarity to the signal charge, is a P-type semiconductor region. In addition, the first conductivity type carrier is an electron, and the second conductivity type carrier is a hole. The first conductivity type impurity is a donor impurity, and the second conductivity type impurity is an acceptor impurity. Although a case where one node of the APD is set to a fixed potential will be described below, the potentials of both nodes may vary.

On the contrary to the above example, the cathode of the APD may be set to a fixed potential and a signal may be extracted from the anode side. In this case, the semiconductor region of the first conductivity type, which has majority carriers of the same polarity as the signal charge, is the P-type semiconductor region. The semiconductor region of the second conductivity type, which has majority carriers of the opposite polarity to the signal charge, is the N-type semiconductor region. In addition, the first conductivity type carrier is a hole, and the second conductivity type carrier is an electron. The first conductivity type impurity is the acceptor impurity, and the second conductivity type impurity is the donor impurity. In the case of a configuration in which holes are detected as signal charges, the conductivity types of semiconductor regions to be described later are opposite to each other.

The quenching element 24 converts a change in the avalanche current generated in the photoelectric conversion element 22 into a voltage signal. In addition, the quenching element 24 functions as a load circuit (quench circuit) at the time of signal multiplication by avalanche multiplication, and suppresses avalanche multiplication by reducing a voltage applied to the photoelectric conversion element 22. The operation in which the quenching element 24 suppresses avalanche multiplication is called a quench operation. In addition, the quenching element 24 returns the voltage supplied to the photoelectric conversion element 22 to the voltage VH by flowing a current corresponding to the voltage drop by a quenching operation. The operation of returning the voltage supplied to the photoelectric conversion element 22 back to the voltage VH using the quenching element 24 is called a recharge operation. The quenching element 24 may be configured by a resistor element, a MOS transistor, or the like.

The waveform shaping unit 32 includes an input node to which an output signal of the photoelectric conversion unit 20 is input and an output node. The waveform shaping unit 32 converts an analog signal output from the photoelectric conversion unit 20 into a pulse signal. For example, as illustrated in FIG. 4, the waveform shaping unit 32 may be configured using a NOT circuit (inverter circuit). FIG. 4 illustrates an example in which the waveform shaping unit 32 is configured by one inverter circuit, but the waveform shaping unit 32 may be configured by a circuit in which a plurality of inverter circuits are connected in series. Further, the waveform shaping unit 32 can be configured not only by the NOT circuit but also by other circuits having a waveform shaping effect, such as a logic circuit including a NOR circuit, a NAND circuit, and the like. The output node of the waveform shaping unit 32 is connected to the counter circuit 34.

The counter circuit 34 includes an input node to which the output signal of the waveform shaping unit 32 is input, an input node connected to the control line 14, an output node, and a flip-flop circuit. The counter circuit 34 counts pulses superimposed on a signal output from the waveform shaping unit 32 and holds a count value which is a count result. The signal supplied from the vertical scanning circuit unit 40 to the counter circuit 34 via the control line 14 may include an enable signal for controlling a pulse counting period (exposure period), a reset signal for resetting a count value held by the counter circuit 34, and the like. The output node of the counter circuit 34 is connected to the data line 16 via the selection circuit 36, and outputs a count signal indicating a count value to the data line 16 via the selection circuit 36.

The selection circuit 36 switches an electrical connection state (connection or non-connection) between the counter circuit 34 and the data line 16. The selection circuit 36 switches the connection state between the counter circuit 34 and the data line 16 in accordance with a control signal supplied from the vertical scanning circuit unit 40 via the control line 14.

One pixel signal processing unit 30 is not necessarily provided for each pixel 12 and may be provided for the pixels 12.

In this case, the signal processing of the pixels 12 can be sequentially performed using one pixel signal processing unit 30. When the pixel signal processing unit 30 includes the waveform shaping unit 32, the counter circuit 34, and the selection circuit 36, each of the pixel signal processing units 30 does not necessarily include all of the waveform shaping unit 32, the counter circuit 34, and the selection circuit 36.

The photoelectric conversion device 100 according to the present embodiment may be formed on one substrate, or may be configured as a stacked photoelectric conversion device in which a plurality of substrates are stacked. In the latter case, for example, as illustrated in FIG. 1, the photoelectric conversion device can be configured as a stacked photoelectric conversion device in which the sensor substrate 110 and the circuit substrate 180 are stacked and electrically connected to each other. At least the photoelectric conversion element 22 among the constituent elements of the pixel 12 can be disposed on the sensor substrate 110. In addition, among the constituent elements of the pixels 12, the quenching element 24 and the pixel signal processing unit 30 can be disposed on the circuit substrate 180.

The photoelectric conversion element 22, the quenching element 24, and the pixel signal processing unit 30 are electrically connected to each other via a connection wiring provided for each pixel 12. The circuit substrate 180 may further include the vertical scanning circuit unit 40, the readout circuit unit 50, the horizontal scanning circuit unit 60, the output circuit unit 70, and the control unit 80.

The photoelectric conversion element 22, the quenching element 24, and the pixel signal processing unit 30 of each pixel 12 may be provided on the sensor substrate 110 and the circuit substrate 180 so as to overlap each other in a plan view. The vertical scanning circuit unit 40, the readout circuit unit 50, the horizontal scanning circuit unit 60, the output circuit unit 70, and the control unit 80 can be disposed around the pixel region 10 including the pixels 12. Here, the term "plan view" refers to a view from a direction perpendicular to a surface of the sensor substrate 110.

By configuring the stacked photoelectric conversion device 100, it is possible to increase an integration density of the elements and achieve higher functionality. In particular, the photoelectric conversion element 22 is arranged on one substrate, and the quenching element 24 and the pixel signal processing unit 30 are arranged on the other substrate, the photoelectric conversion element 22 can be arranged at high density without sacrificing a light receiving region of the photoelectric conversion element 22, and a photon detection efficiency can be improved.

The number of substrates constituting the photoelectric conversion device 100 is not limited to two, and three or more substrates may be stacked to constitute the photoelectric conversion device 100.

In FIG. 1, a diced chip is assumed as the sensor substrate 110 and the circuit substrate 180, but the sensor substrate 110 and the circuit substrate 180 are not limited to chips. For example, each of the sensor substrate 110 and the circuit substrate 180 may be a wafer. In addition, the sensor substrate 110 and the circuit substrate 180 may be stacked in wafer form and then diced, or they may be individually made into chips and then stacked and bonded.

Next, a basic operation of the photoelectric conversion unit 20 in the photoelectric conversion device 100 according to the present embodiment will be described with reference to FIGS. 5A and 5B. FIGS. 5A and 5B are diagrams illustrating a basic operation of the photoelectric conversion unit in the photoelectric conversion device 100 according to the present embodiment. FIG. 5A is a circuit diagram of the photoelectric conversion element 22, the quenching element 24, and the waveform shaping unit 32. FIG. 5B illustrates a waveform of a signal at an input node (node A) and an output node (node B) of the waveform shaping unit 32.

At time t0, a reverse bias voltage having a potential difference corresponding to (voltage VH–voltage VL) is applied to the photoelectric conversion element 22. Although a reverse bias voltage sufficient to cause an avalanche multiplication operation is applied between the anode and cathode of the APD constituting the photoelectric conversion element 22, carriers serving as a seed of avalanche multiplication do not exist in a state where photons are not incident on the photoelectric conversion element 22. Therefore, avalanche multiplication does not occur in the photoelectric conversion element 22, and no current flows through the photoelectric conversion element 22.

At the subsequent time t1, it is assumed that a photon is incident on the photoelectric conversion element 22. When a photon enters the photoelectric conversion element 22, an electron-hole pair is generated by photoelectric conversion, avalanche multiplication occurs using these carriers as seeds, and an avalanche multiplication current flows through the photoelectric conversion element 22. When the avalanche multiplication current flows through the quenching element 24, a voltage drop occurs due to the quenching element 24, and the voltage of the node A starts to drop. When the voltage drop amount of the node A becomes large and the avalanche multiplication operation is stopped at time t3, the voltage level of the node A no longer drops.

When the avalanche multiplication operation in the photoelectric conversion element 22 is stopped, a current that compensates for the voltage drop flows from the node to which the voltage VL is supplied to the node A through the photoelectric conversion element 22, and the voltage of the node A gradually increases. Thereafter, at time t5, the node A is settled to the original voltage level.

The waveform shaping unit 32 binarizes the signal input from the node A according to a predetermined determination threshold, and outputs the signal from the node B. Specifically, the waveform shaping unit 32 outputs a low-level signal from the node B when the voltage level of the node A exceeds the determination threshold. The waveform shaping unit 32 outputs a high-level signal from the node B when the voltage level of the node A is equal to or less than the determination threshold. For example, as illustrated in FIG. 5B, it is assumed that the voltage of the node A is equal to or lower than the determination threshold in the period from the time t2 to the time t4. In this case, as illustrated in FIG. 5B, the signal level at the node B becomes the low level in the period from the time to t0 the time t2 and the period from the time t4 to the time t5, and becomes the high level in the period from the time t2 to the time t4.

In this way, the analog signal input from the node A is waveform-shaped into a digital signal by the waveform shaping unit 32. A pulse signal output from the waveform shaping unit 32 in response to incidence of a photon on the photoelectric conversion element 22 is a photon detection pulse signal.

Figure 6:
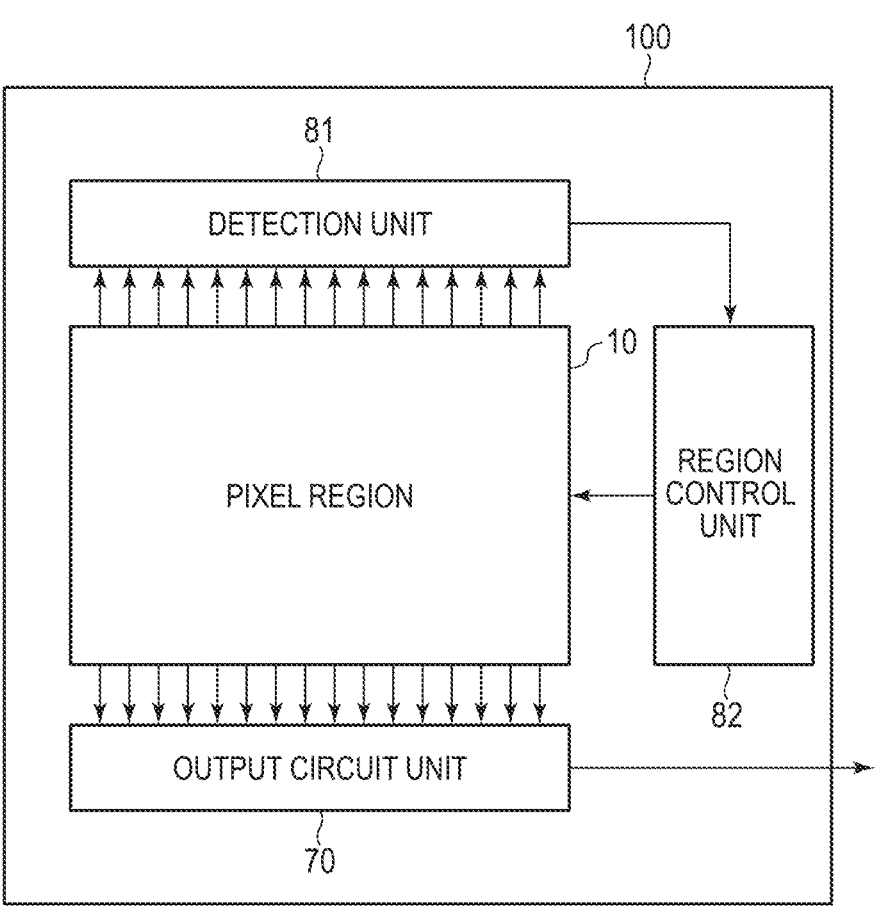
FIG. 6 is a functional block diagram illustrating a configuration example of a main part of the photoelectric conversion device according to the first embodiment of the present disclosure.
Figure 7:
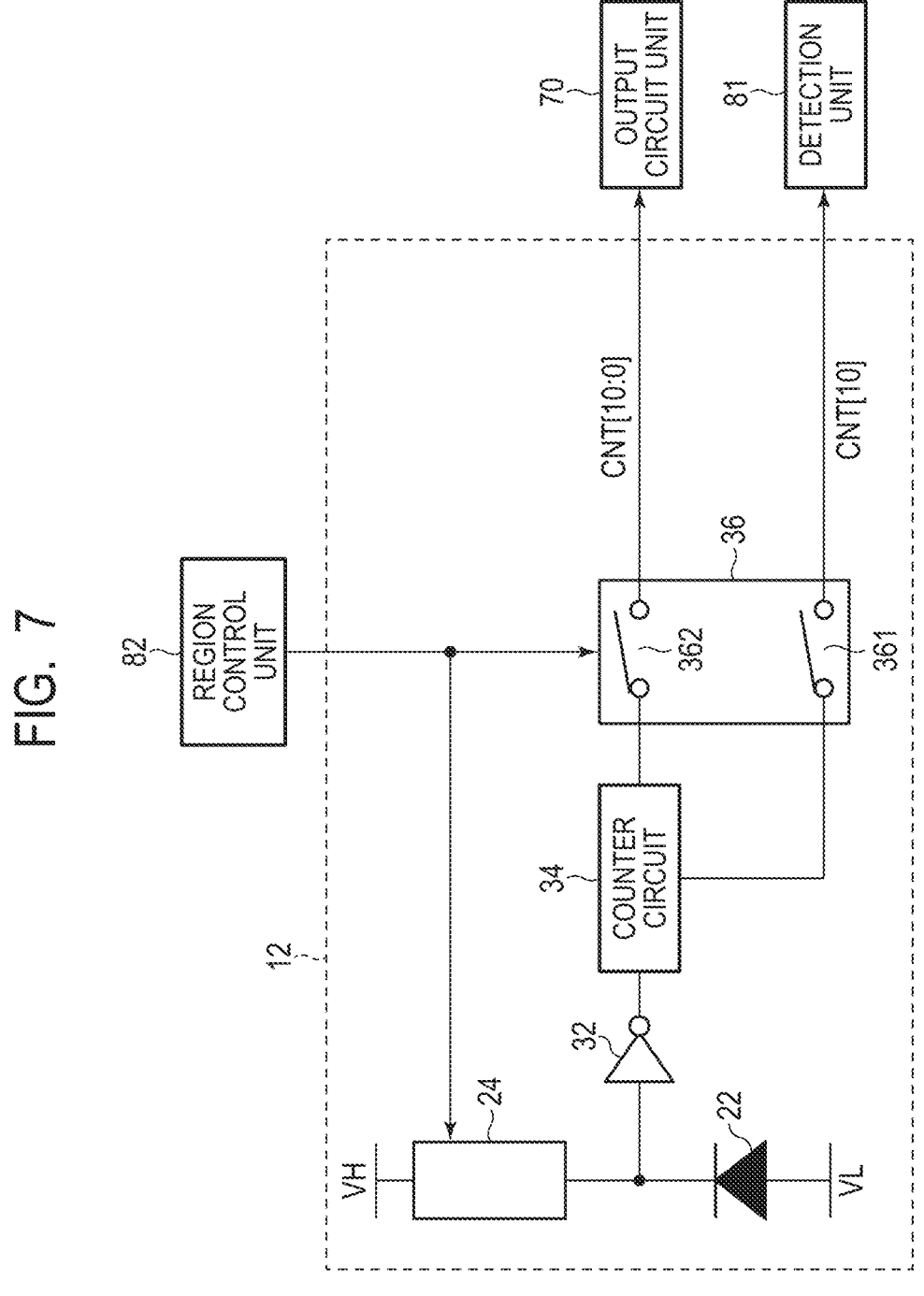
FIG. 7 is a block diagram illustrating a configuration example of a pixel of the photoelectric conversion device according to the first embodiment of the present disclosure.

Next, a process of improving the processing speed of the photoelectric conversion device 100 will be described with reference to FIGS. 6 and 7. FIG. 6 is a functional block diagram illustrating a configuration example of a main part of the photoelectric conversion device 100 according to the present embodiment. In FIG. 6, the pixel region 10, the detection unit 81, the region control unit 82, and the output circuit unit 70 are illustrated as main parts of the photoelectric conversion device 100, and the flow of processing of these main parts is indicated by arrows. FIG. 7 is a block diagram illustrating a configuration example of the pixel 12 of the photoelectric conversion device 100 according to the present embodiment.

The counter circuit 34 includes, for example, a flip-flop circuit capable of holding 11-bit information. The counter circuit 34 counts the photon detection signal (pulse signal) output from the waveform shaping unit 32, and holds a count value as a count result in the 11-bit flip-flop circuit. The counter circuit 34 outputs a count signal indicating the count value to the readout circuit unit 50 via the selection circuit 36. For example, the counter circuit 34 is switched so as to output upper bit information (CNT [10]), which is information of the most significant bit (MSB) of the 11 bits, to the detection unit 81 via the selection circuit 36 and the readout circuit unit 50. In addition, the counter circuit 34 is switched so as to output all bit information (CNT [10:0]), which is all information of 11 bits, to the output circuit unit 70 via the selection circuit 36 and the readout circuit unit 50. The upper bit information (CNT [10]) is an example of the first information, and the all bit information (CNT [10:0]) is an example of the second information.

As illustrated in FIG. 7, the selection circuit 36 includes a first switch circuit 361, a second switch circuit 362, and a buffer circuit (not illustrated). The buffer circuit temporarily stores the count signal output from the counter circuit 34.

The first switch circuit 361 is provided on the data line 16 that connects the counter circuit 34 and the readout circuit unit 50. The first switch circuit 361 switches the connection state between the counter circuit 34 and the readout circuit unit 50 in accordance with a control signal supplied from the region control unit 82 via the vertical scanning circuit unit 40. For example, the first switch circuit 361 is turned on based on a control signal output from the region control unit 82, and causes the counter circuit 34 to output the upper bit information (CNT [10]) to the detection unit 81 via the readout circuit unit 50. In addition, the first switch circuit 361 is turned off based on the control signal output from the region control unit 82 and causes the counter circuit 34 not to output the upper bit information (CNT [10]) to the detection unit 81.

The second switch circuit 362 is provided on the data line 16 that connects the counter circuit 34 and the readout circuit unit 50. The second switch circuit 362 switches the connection state between the counter circuit 34 and the readout circuit unit 50 in accordance with a control signal supplied from the region control unit 82 via the vertical scanning circuit unit 40. For example, the second switch circuit 362 is turned on based on a control signal output from the region control unit 82, and causes the counter circuit 34 to output all of the 11-bit information CNT [10:0] to the output circuit unit 70 via the readout circuit unit 50. In addition, the second switch circuit 362 is turned off based on the control signal output from the region control unit 82, and causes the counter circuit 34 not to output all the bit information (CNT [10:0]) to the output circuit unit 70.

The detection unit 81 detects the pixel 12 to be read based on the upper bit information (CNT [10]) of each pixel 12 output from the first switch circuit 361. For example, when the upper bit information (CNT [10]) of the pixel 12 output from the counter circuit 34 is "1", that is, High level (first logical value), the detection unit 81 extracts the pixel 12 as a detection pixel 12a to be read. When the upper bit information (CNT [10]) of the pixel 12 output from the counter circuit 34 is "0", that is, Low level (second logical value), the detection unit 81 does not extract the pixel 12 as the detection pixel 12a to be read. When the detection pixel 12a to be read is extracted, the detection unit 81 outputs information indicating the coordinate position of the detection pixel 12a to the region control unit 82. On the other hand, when the detection pixel 12a to be read is not extracted, the detection unit 81 does not output information indicating the coordinate position of the detection pixel 12a to the region control unit 82. The region control unit 82 controls a region that outputs a pixel signal to the readout circuit unit 50 in the pixel region 10 based on the information indicating the coordinate position output from the detection unit 81.

Figure 8:
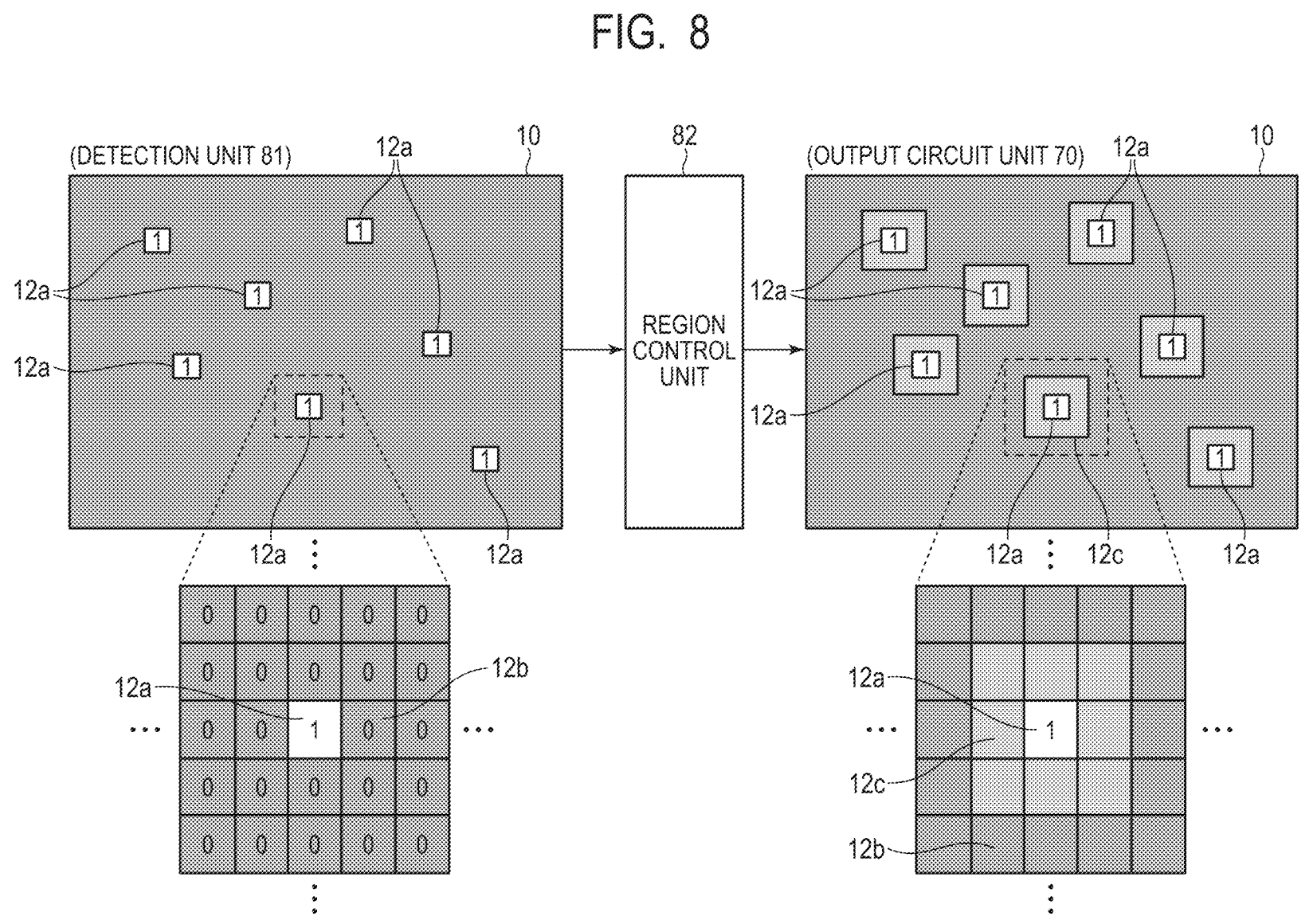

Next, a detailed operation example of the region control unit 82 will be described with reference to FIG. 8. FIG. 8 is a diagram illustrating a first operation example of the region control unit 82 of the photoelectric conversion device 100 according to the present embodiment.

The region control unit 82 controls a region that outputs a pixel signal to the readout circuit unit 50 in the pixel region 10 based on the information indicating the coordinate position output from the detection unit 81. In this case, the region control unit 82 controls the number of pixels 12 to be output to be greater than the number of pixels 12 detected by the detection unit 81.

Specifically, as illustrated in FIG. 8, the region control unit 82 specifies the detection pixel 12a extracted by the detection unit 81 based on the information indicating the coordinate position output from the detection unit 81. In the enlarged view illustrated in FIG. 8, the detection pixel 12a extracted by the detection unit 81 is denoted by "1", and the non-detection pixel 12b not extracted by the detection unit 81 is denoted by "0". The region control unit 82 specifies an adjacent pixel 12c adjacent to the specified detection pixel 12a based on the specified detection pixel 12a. Specifically, the region control unit 82 specifies the non-detection pixel 12b located within a predetermined distance from the detection pixel 12a as the adjacent pixel 12c. More specifically, the region control unit 82 specifies the non-detection pixel 12b surrounding one detection pixel 12a as the adjacent pixel 12c. More specifically, the pixels 12 are arranged on XY coordinates having an X axis and a Y axis orthogonal to each other. The adjacent pixels 12c surrounding one detection pixel 12a are configured by arranging at least three adjacent pixels 12c in the X-axis direction and arranging at least three adjacent pixels 12c in the Y-axis direction, and have a rectangular shape. The adjacent pixel 12c is basically a non-detection pixel 12b which is not extracted by the detection unit 81. As described above, the detection pixel 12a and its adjacent pixel 12c specified by the region control unit 82 are configured by 3×3 pixels, and are formed in the rectangular shape as a whole. In this 3×3 pixels configuration, one detection pixel 12a is located at the center, and eight adjacent pixels 12c are located so as to surround the detection pixel 12a.

Figure 9:
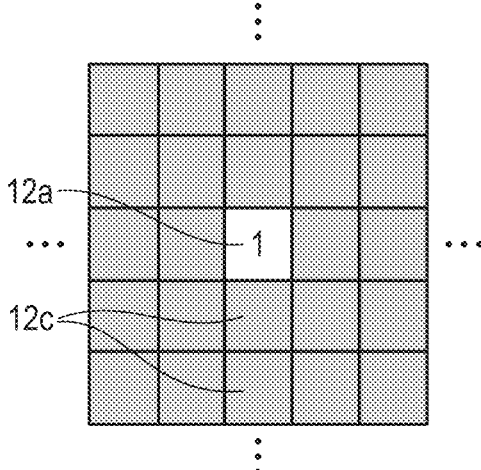
FIG. 9 is a diagram illustrating a second operation example of the region control unit of the photoelectric conversion device according to the first embodiment of the present disclosure.

The region control unit 82 sequentially scans the detection pixels 12a and the adjacent pixels 12c in units of rows via the vertical scanning circuit unit 40. At this time, the region control unit 82 controls the second switch circuit 362 of each of the detection pixel 12a and the adjacent pixel 12c to output all bit information (CNT [10:0]) of each of the detection pixel 12a and the adjacent pixel 12c to the readout circuit unit 50. The readout circuit unit 50 holds all the bit information (CNT [10:0]) in the holding unit of the corresponding column. The region control unit 82 sequentially scans all the bit information (CNT [10:0]) held in the readout circuit unit 50 in units of columns via the horizontal scanning circuit unit 60, and causes the readout circuit unit 50 to output all the bit information (CNT [10:0]) held therein to the output circuit unit 70. Note that, for example, when the photoelectric conversion device 100 is used for distance measurement, light emitted from a light emitting unit toward an object may be a dot pattern of near-infrared light. In this case, since the dot pattern has a circular shape and a Gaussian distribution, it is desirable to acquire the pixel signal in a form including luminance distribution in order to improve the accuracy of the luminance center of gravity. Further, in the configuration of only one pixel, an effect of a sub-pixel rendering cannot be expected so much, and therefore, the configuration of at least 3×3 pixels is desirable. Further, as illustrated in FIG. 9, the region control unit 82 may configure the detection pixel 12a and the adjacent pixel 12c to have a configuration of 5×5 pixels. FIG. 9 is a diagram illustrating a second operation example of the region control unit 82 of the photoelectric conversion device 100 according to the present embodiment. With the configuration of 5×5 pixels, correction such as aberration correction can be easily performed even when a dot pattern spreads due to aberration of a lens or the like. Further, the configuration of 3×3 pixels and the configuration of 5×5 pixels may be mixed in the same frame.

Figure 10:
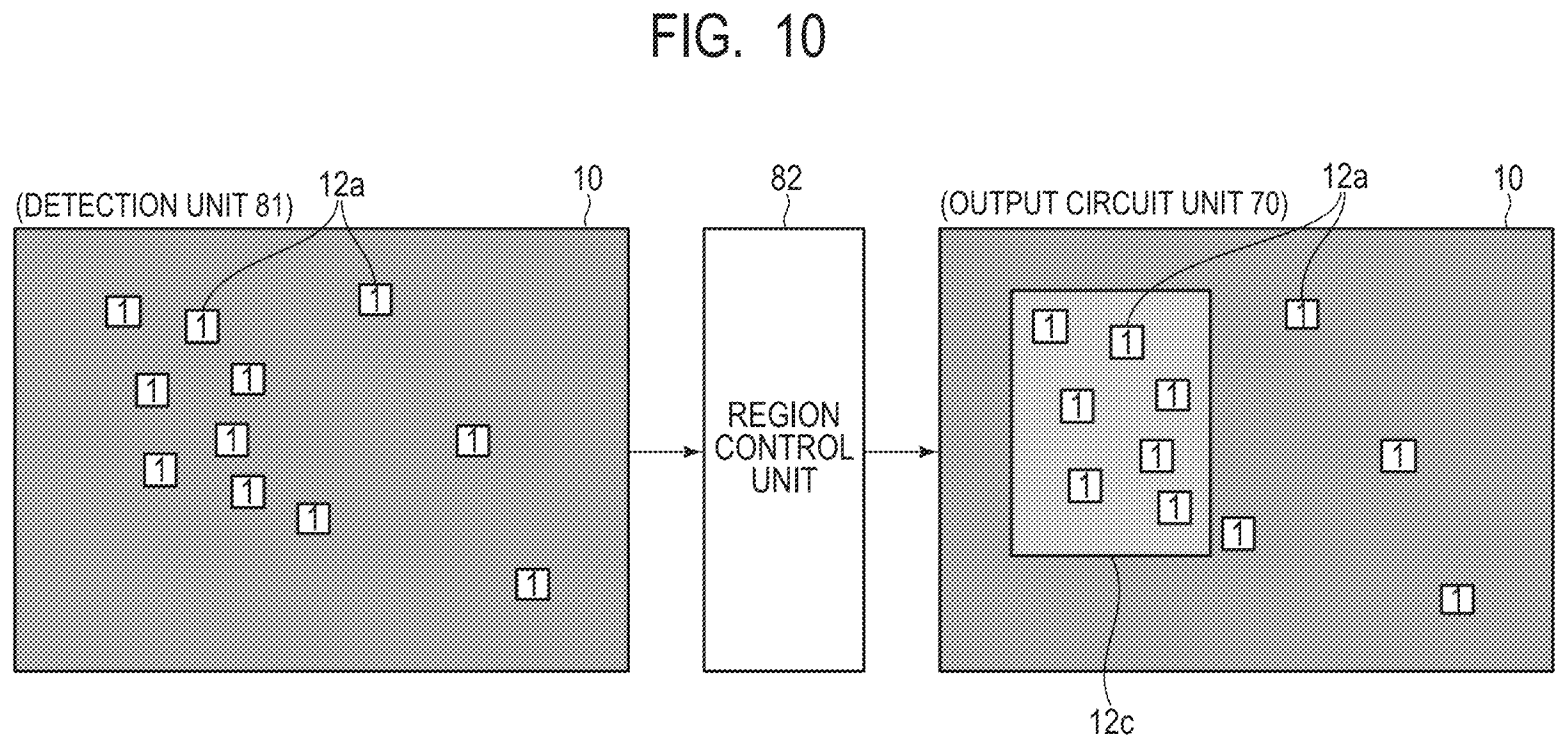

Next, another operation example of the region control unit 82 will be described with reference to FIG. 10. FIG. 10 is a diagram illustrating a third operation example of the region control unit 82 of the photoelectric conversion device 100 according to the present embodiment. In the present embodiment, the region control unit 82 does not specify the adjacent pixel 12c for each detection pixel 12a, but specifies the adjacent pixel 12c for each region based on the region in which the detection pixels 12a are densely arranged. Here, the density means that the number of detection pixels 12a present per unit region is equal to or larger than a predetermined reference number. For example, the region control unit 82 specifies, as the adjacent pixel 12c, a non-detection pixel 12b within a region surrounding a portion in which the detection pixels 12a are densely arranged in the pixel region 10. The region is a rectangular region illustrated in FIG. 10. Then, the region control unit 82 controls the second switch circuits 362 of the detection pixels 12a and the adjacent pixels 12c included in the region via the vertical scanning circuit unit 40, and causes them to output all the bit information (CNT [10:0]) to the readout circuit unit 50. Then, the region control unit 82 controls the horizontal scanning circuit unit 60 to output all bit information (CNT [10:0]) of each of the detection pixel 12a and the adjacent pixel 12c from the readout circuit unit 50 to the output circuit unit 70. In addition, the region control unit 82 controls the second switch circuit 362 of the detection pixel 12a not included in the region via the vertical scanning circuit unit 40, and causes them to output all bit information (CNT [10:0]) to the readout circuit unit 50. Then, the region control unit 82 controls the horizontal scanning circuit unit 60 to output all bit information (CNT [10:0]) of the detection pixel 12a from the readout circuit unit 50 to the output circuit unit 70.

Figure 11:
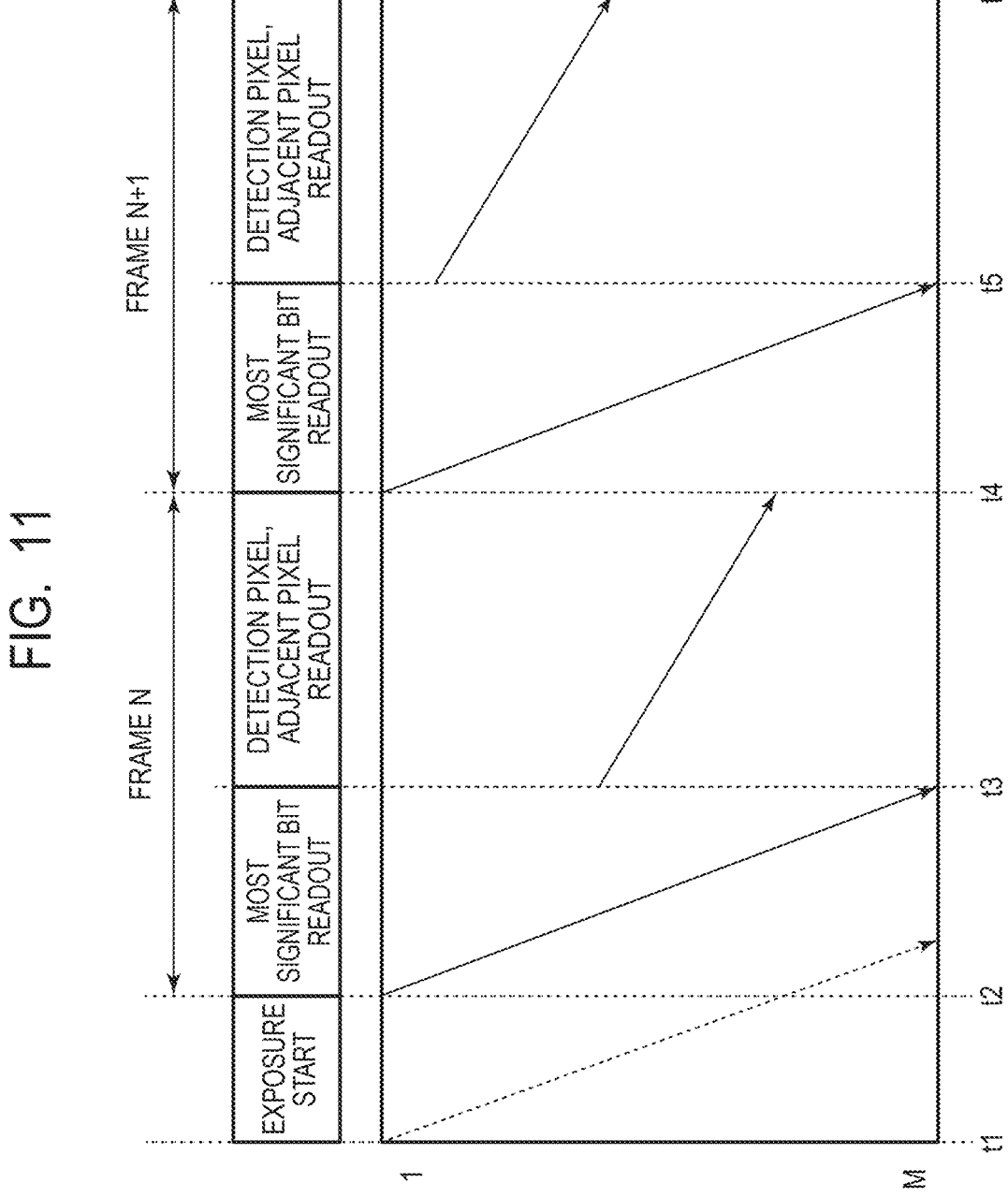
FIG. 11 is a timing chart illustrating a first operation example of the photoelectric conversion device according to the first embodiment of the present disclosure.

Next, an operation example of the photoelectric conversion device 100 will be described with reference to FIG. 11. FIG. 11 is a timing chart illustrating a first operation example of the photoelectric conversion device 100 according to the present embodiment. As illustrated in FIG. 11, at time t1, the photoelectric conversion device 100 starts exposure of the pixels 12 arranged in the first row of the pixel region 10, and sequentially performs exposure for each row.

At time t2, the counter circuit 34 of each pixel 12 arranged in the first row of the pixel region 10 outputs the upper bit information (CNT [10]) of the count signal to the detection unit 81. The detection unit 81 extracts the detection pixels 12a to be read based on the upper bit information (CNT [10]) of the pixels 12 in the first row output from the counter circuit 34.

At time t3, the counter circuit 34 of each pixel 12 arranged in the M-th row (last row) of the pixel region 10 outputs the upper bit information (CNT [10]) of the count signal to the detection unit 81. The detection unit 81 extracts the detection pixels 12a to be read based on the upper bit information (CNT [10]) of the pixels 12 in the M-th row (last row) output from the counter circuit 34.

At time t3, the region control unit 82 specifies the adjacent pixel 12c adjacent to the detection pixel 12a based on the detection pixel 12a extracted by the detection unit 81. Then, the region control unit 82 starts reading the detection pixel 12a and the adjacent pixel 12c. Specifically, the region control unit 82 causes all bit information (CNT [10:0]) of the detection pixel 12a and the adjacent pixel 12c to be output to the readout circuit unit 50. Then, the region control unit 82 causes all the bit information (CNT [10:0]) of the readout circuit unit 50 to be output to the output circuit unit 70. In FIG. 11, an arrow corresponds to a row from which the detection pixel 12a and the adjacent pixel 12c are read in the pixel region 10.

At time t4, the region control unit 82 ends the readout of the detection pixel 12a and the adjacent pixel 12c in the frame N. The detection frame from which the detection pixel 12a is extracted at the time t2 to the time t3 and the readout frame from which all the bit information (CNT [10:0]) of the detection pixel 12a and the adjacent pixel 12c is read out at the time t3 to the time t4 constitute one frame (frame N).

Exposure is started to generate the next frame N+1. After the exposure is started, at time t4, extraction of the detection pixel 12a is started, and at time t5, extraction of the detection pixel 12a is ended. Then, at time t5, the readout of the detection pixel 12a and the adjacent pixel 12c is started, and at time t6, the readout of the detection pixel 12a and the adjacent pixel 12c is ended. Since the adjacent pixel 12c is specified based on the detection pixel 12a, the adjacent pixel 12c may be different between the frame N and the frame N+1.

Figure 12:
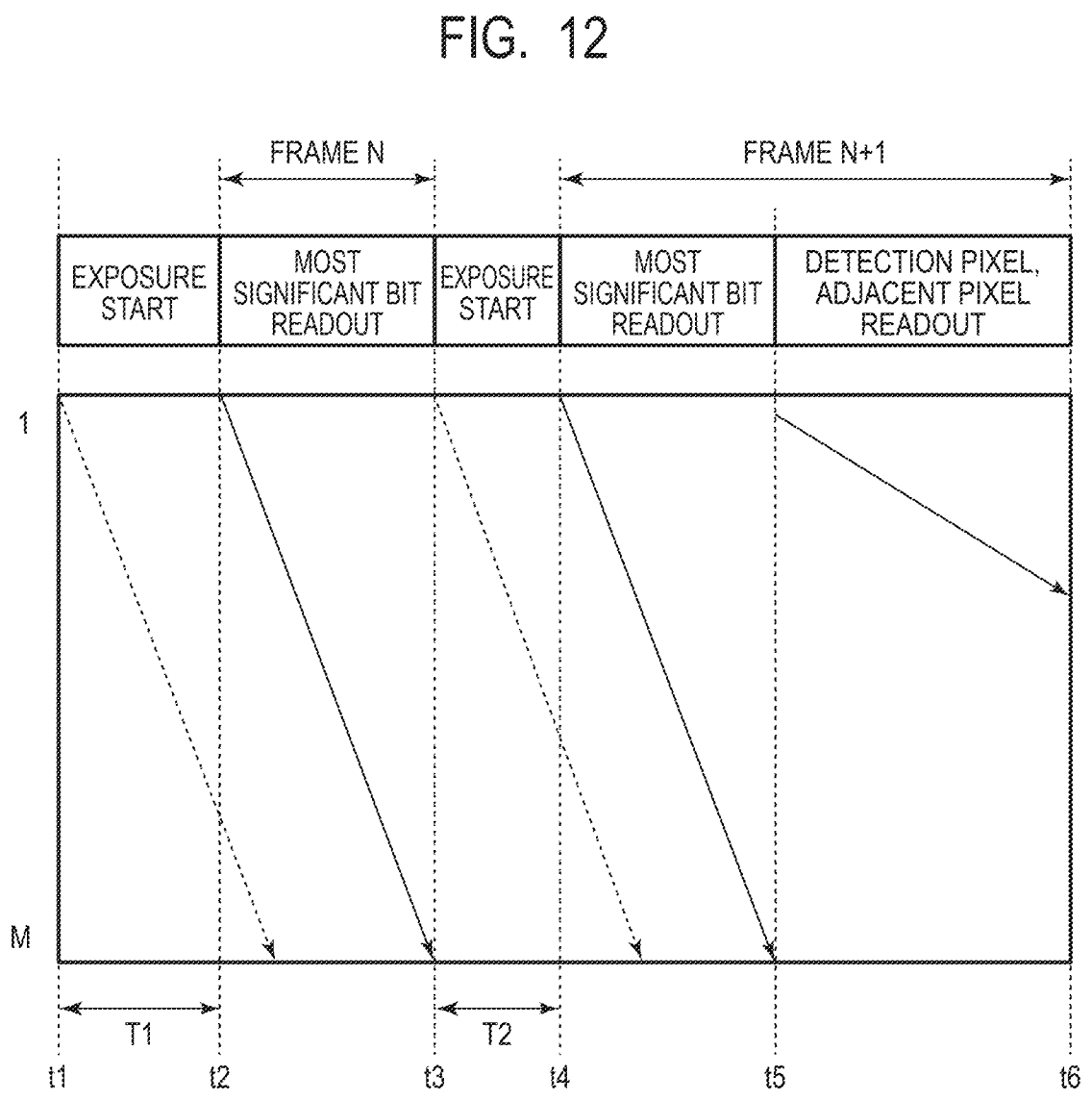

Depending on the exposure conditions of a subject or an environment, the number of detection pixels 12a in a frame may increase, and the number of adjacent pixels 12c may also increase. In this case, it takes a long time to read out the information of the detection pixel 12a and the adjacent pixel 12c and output the information to the output circuit unit 70, which may cause a decrease in processing speed as a whole. For this reason, when the number of detection pixels 12a in a frame is large, reading of the pixels 12 in the frame may be skipped, the exposure period may be shortened, and then the frame may be changed to the next frame. FIG. 12 is a timing chart illustrating a second operation example of the photoelectric conversion device according to the present embodiment. For example, when the number of detection pixels 12a in the frame N is equal to or larger than a predetermined reference number of pixels, the region control unit 82 skips reading of the detection pixels 12a and the adjacent pixels 12c in the frame N. Then, the region control unit 82 makes the exposure period of the next frame N+1 shorter than the exposure period of the frame N. In FIG. 12, a period from time t1 to time t2 is the exposure period T1 of the frame N, and a period from time t3 to time t4 is the exposure period T2 of the frame N+1. The exposure period T2 of the frame N+1 is shorter than the exposure period T1 of the frame N. As described above, the region control unit 82 controls the exposure period of the photoelectric conversion unit 20 according to the number of the detection pixels 12a. This makes it possible to suppress an increase in the number of detection pixels 12a, thereby suppressing a decrease in the processing speed as a whole.

As described above, the photoelectric conversion device 100 according to the present embodiment includes the pixels 12 and the detection unit 81. Each of the pixels 12 includes the photoelectric conversion unit 20, the counter circuit 34, and the selection circuit 36. The photoelectric conversion unit 20 outputs a photon detection signal according to incidence of a photon. The counter circuit 34 holds a count value obtained by counting the photon detection signal in a predetermined bit number. The selection circuit 36 switches the information output from the counter circuit 34 to upper bit information or all bit information of the predetermined number of bits held by the counter circuit 34. The detection unit 81 extracts a detection pixel 12a for outputting all bit information from among the pixels 12 based on upper bit information. With this configuration, in the photoelectric conversion device 100 according to the present embodiment, the detection unit 81 can detect the pixels 12 to which all bit information is output by checking only the upper bit information. As a result, the detection unit 81 can increase the detection speed as compared with the case of extracting the detection pixels 12a by checking all the bit information. In the present embodiment, the counter circuit 34 is provided for each pixel 12, and the digital conversion is performed for each pixel 12. Accordingly, by reading only one bit of the upper bit for each pixel 12, it is possible to improve the reading speed to the detection unit 81 as compared with the case of reading all 11 bits. Further, by checking only the upper bit by the detection unit 81, the influence of dark noise or optical shot noise can be reduced. In this way, the readout speed can be improved without lowering the output accuracy of the signal.

In addition, in the photoelectric conversion device 100, the region control unit 82 controls the selection circuit 36 of the detection pixel 12a extracted by the detection unit 81 and causes the counter circuit 34 of the detection pixel 12a to output all bit information. Further, the region control unit 82 specifies, as the adjacent pixel 12c, the non-detection pixel 12b located within a predetermined distance from the detection pixel 12a among the non-detection pixels 12b which are not extracted by the detection unit 81. Then, the region control unit 82 controls the selection circuit 36 of the adjacent pixel 12c and, causes the counter circuit 34 of the adjacent pixel 12c to output all bit information. According to this configuration, the photoelectric conversion device 100 can output the pixels around the detection pixel 12a and can accurately output even in the low luminance region, and thus the accuracy of image quality can be improved. In addition, since the photoelectric conversion device 100 reads out a part of the pixels 12 (the detection pixels 12a and the adjacent pixels 12c) in the pixel region 10, the processing speed can be improved as compared with the case of reading out the entire pixels 12 in the pixel region 10.

Second Embodiment

Figure 13:
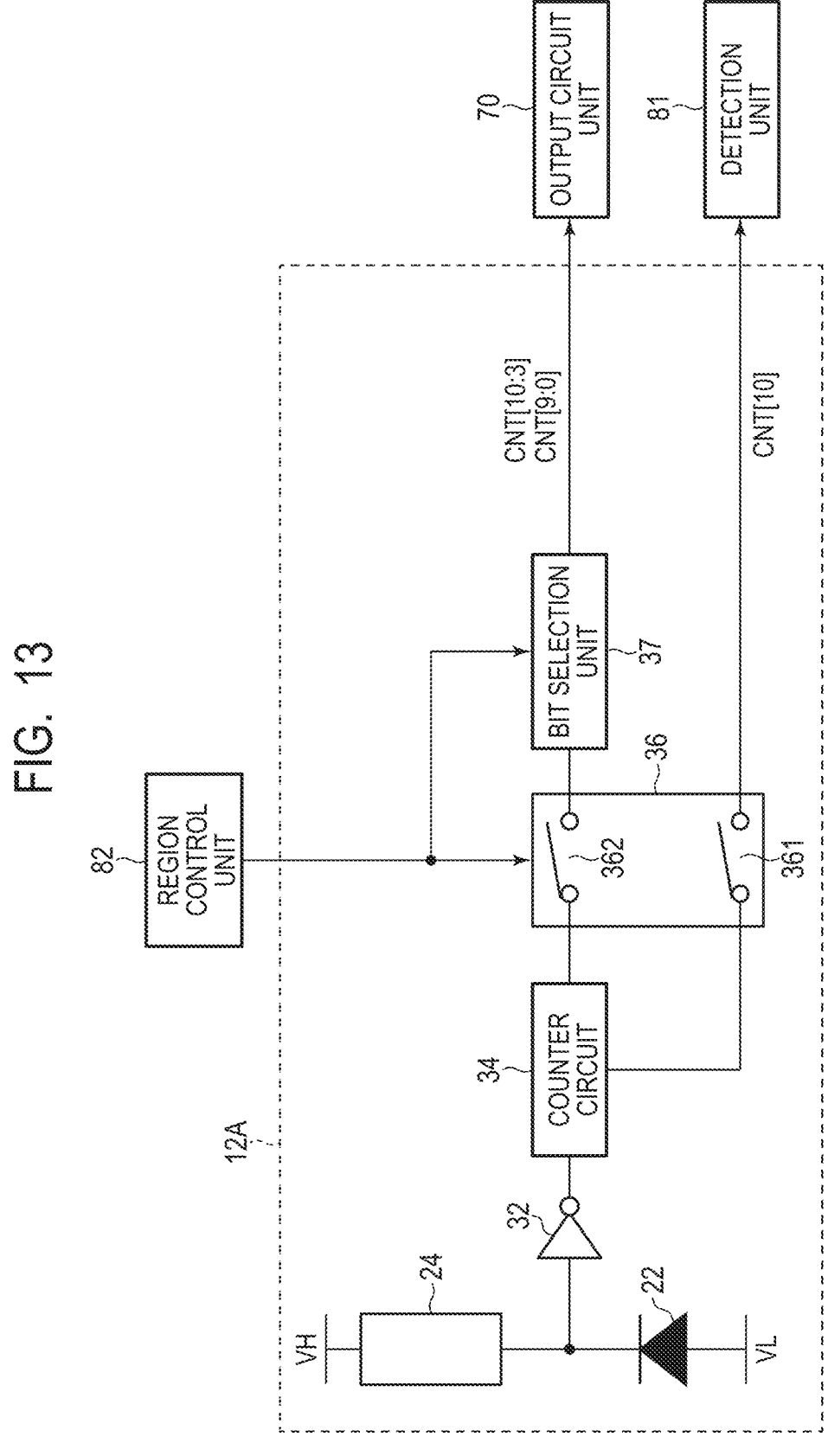
FIG. 13 is a block diagram illustrating a configuration example of a pixel of a photoelectric conversion device according to a second embodiment of the present disclosure.
Figures 14A, 14B:
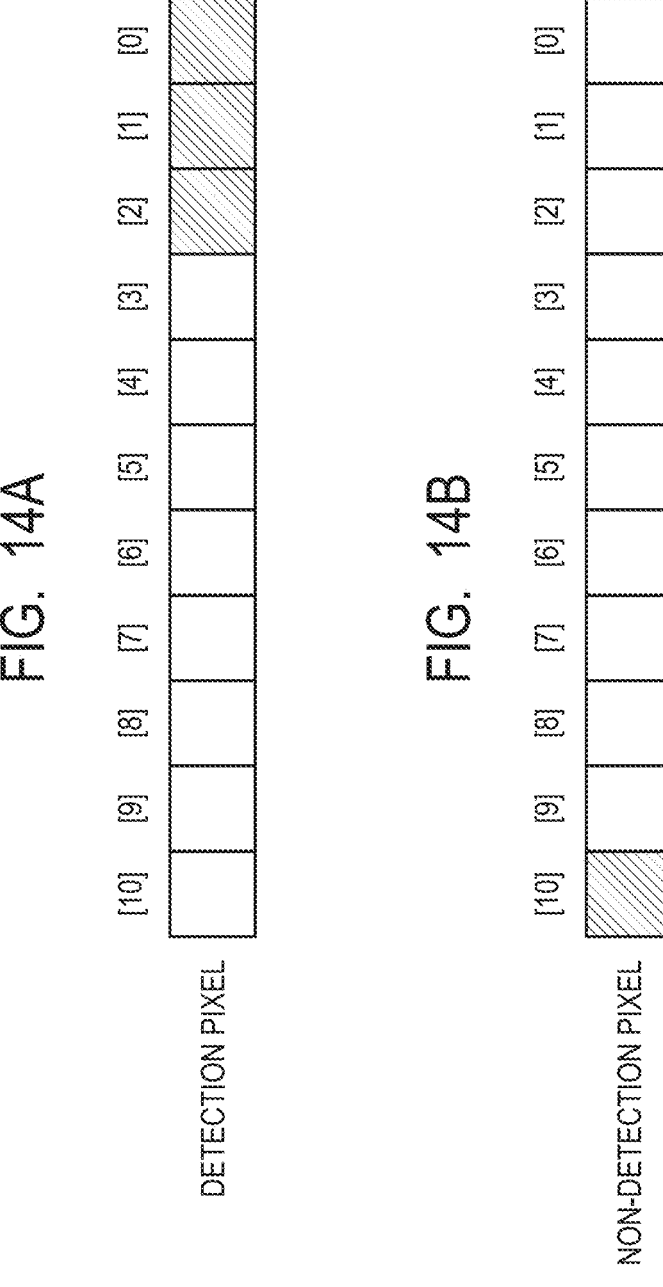
FIG. 14A is diagram illustrating an output example of detection pixel and FIG. 14B is diagram illustrating an output example of non-detection pixel according to the second embodiment of the present disclosure.

Next, a photoelectric conversion device 100 according to a second embodiment will be described. In the photoelectric conversion device 100 according to the second embodiment, the same components as those of the first embodiment are denoted by the same reference numerals, and detailed description thereof will be omitted. FIG. 13 is a block diagram illustrating a configuration example of the pixel 12A of the photoelectric conversion device 100 according to the present embodiment. FIG. 14A is a diagram illustrating an output example of the 11-bit detection pixel 12a according to the present embodiment. FIG. 14B is a diagram illustrating an output example of the 11-bit non-detection pixel 12b according to the present embodiment. The pixel 12A according to the present embodiment differs from the pixel 12 according to the first embodiment in that it includes a bit selection unit 37.

The bit selection unit 37 selects a predetermined bit with respect to the 11-bit count signal. The bit selection unit 37 is provided on the data line 16 that connects the second switch circuit 362 and the readout circuit unit 50. The bit selection unit 37 selects a predetermined bit with respect to all bit information (CNT [10:0]) output from the counter circuit 34 via the second switch circuit 362 based on the control signal output from the region control unit 82. Then, the bit selection unit 37 outputs the selected count signal to the output circuit unit 70 via the readout circuit unit 50. In this case, the bit selection unit 37 makes the number of bits of all the bit information (CNT [10:0]) output from the counter circuit 34 different between the detection pixel 12a and the non-detection pixel 12b. Specifically, when a control signal indicating that the pixel is the detection pixel 12a is output from the region control unit 82, the bit selection unit 37 selects a predetermined bit. That is, the bit selection unit 37 selects the remaining upper 8 bits (CNT [10:3]) obtained by excluding the lower 3 bits (CNT [2:0]) which are the lower bit information from all the bit information (CNT [10:0]) (see FIG. 14A). Then, the bit selection unit 37 outputs the count signal including the upper eight bits (CNT [10:3]) to the output circuit unit 70 via the readout circuit unit 50. Here, in the case of the detection pixel 12a, since the upper bit is "1", the light energy is assumed to be 1000 e or more. In this case, the light shot noise is about 44 e. Therefore, since the lower three bits are buried in the optical shot noise, even if the lower three bits (corresponding to 8 e) are reduced, the influence on the output accuracy is small.

On the other hand, when a control signal indicating that the pixel is the non-detection pixel 12b is output from the region control unit 82, the bit selection unit 37 selects a predetermined bit. That is, the bit selection unit 37 selects the remaining lower 10 bits (CNT [9:0]) obtained by excluding the upper one bit (CNT [10]) as the upper bit information from all the bit information (CNT [10:0]) (see FIG. 14B). Then, the bit selection unit 37 outputs the count signal including the lower 10 bits (CNT [9:0]) to the output circuit unit 70 via the readout circuit unit 50. This is because the upper bits of the non-detection pixels 12b are known to be "0", so that there is no problem even if the upper bits are reduced and output.

As described above, in the photoelectric conversion device 100, the bit selection unit 37 does not output the lower three bits when the output pixel to be output to the output circuit unit 70 is the detection pixel 12a, and does not output the upper one bit when the output pixel is the non-detection pixel 12b. As a result, the photoelectric conversion device 100 can reduce the number of output bits without deteriorating the output accuracy, thereby further improving the speed of reading the pixel signal (count signal) of each pixel 12 from the readout circuit unit 50.

Third Embodiment

Figure 15:
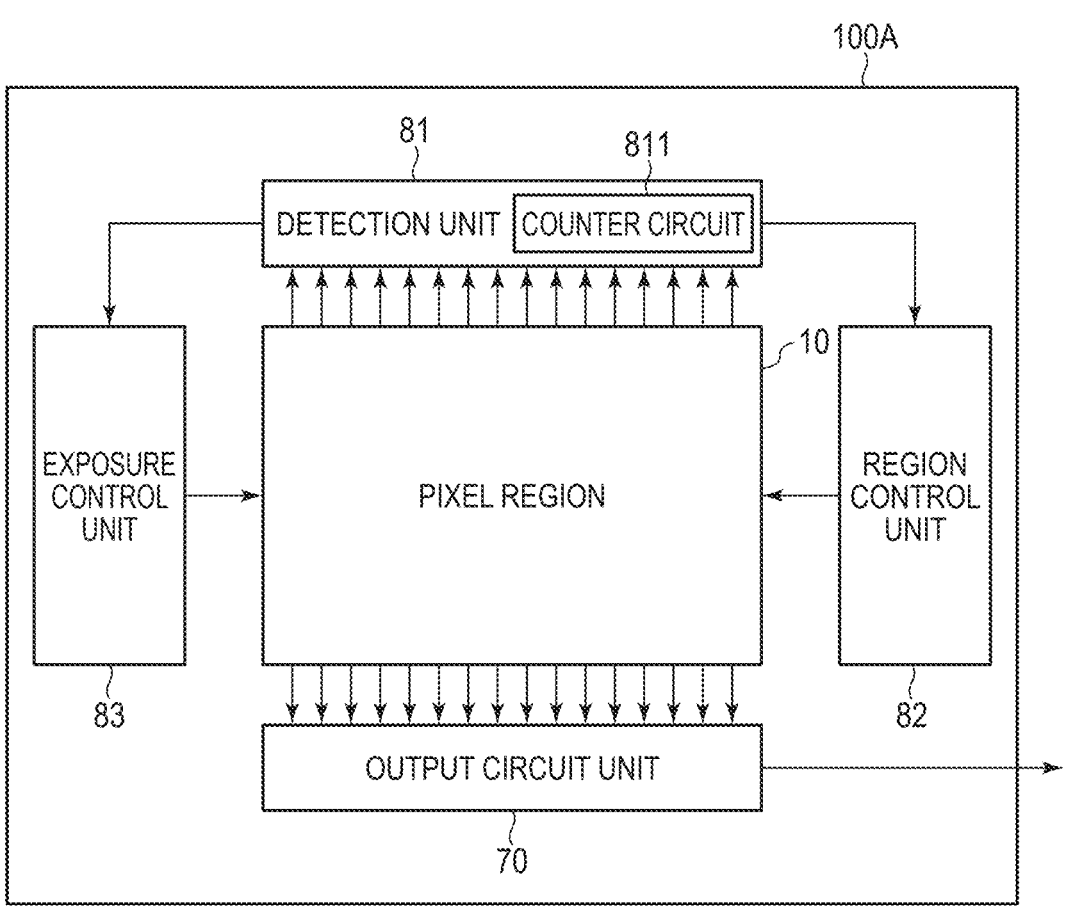
FIG. 15 is a functional block diagram illustrating a configuration example of a main part of a photoelectric conversion device according to a third embodiment of the present disclosure.
Figure 16:
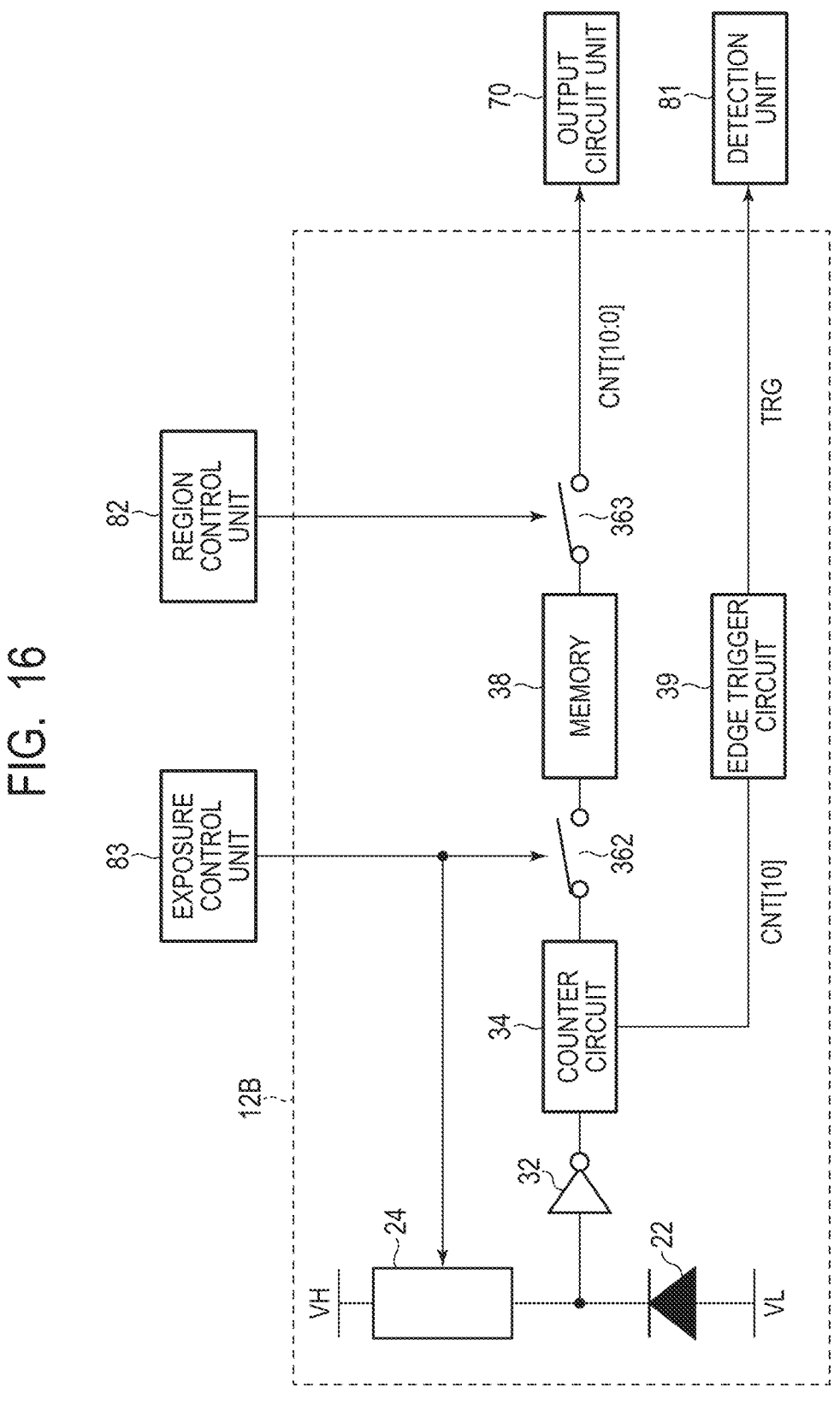
FIG. 16 is a block diagram illustrating a configuration example of a pixel of a photoelectric conversion device according to the third embodiment of the present disclosure.
Figure 17:
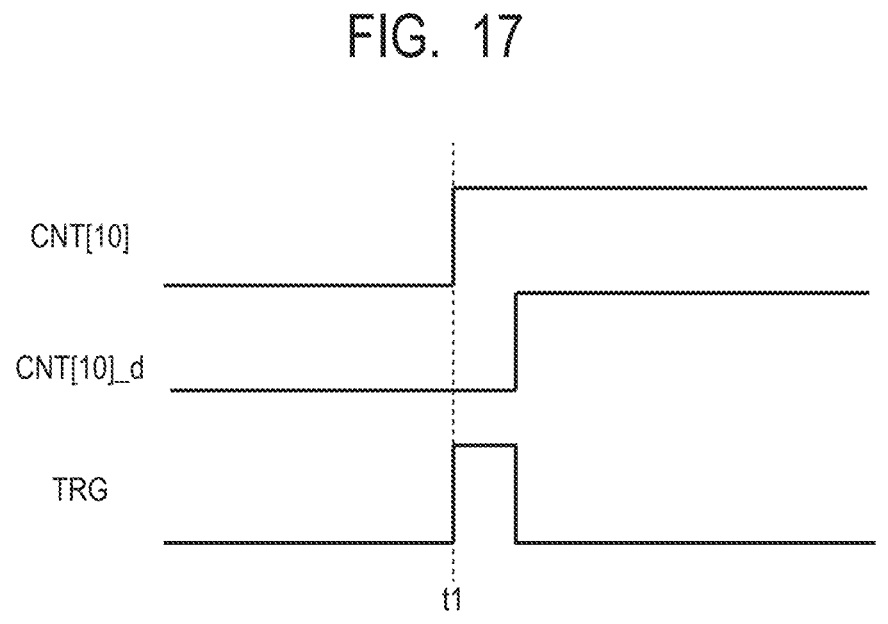
Figure 18:
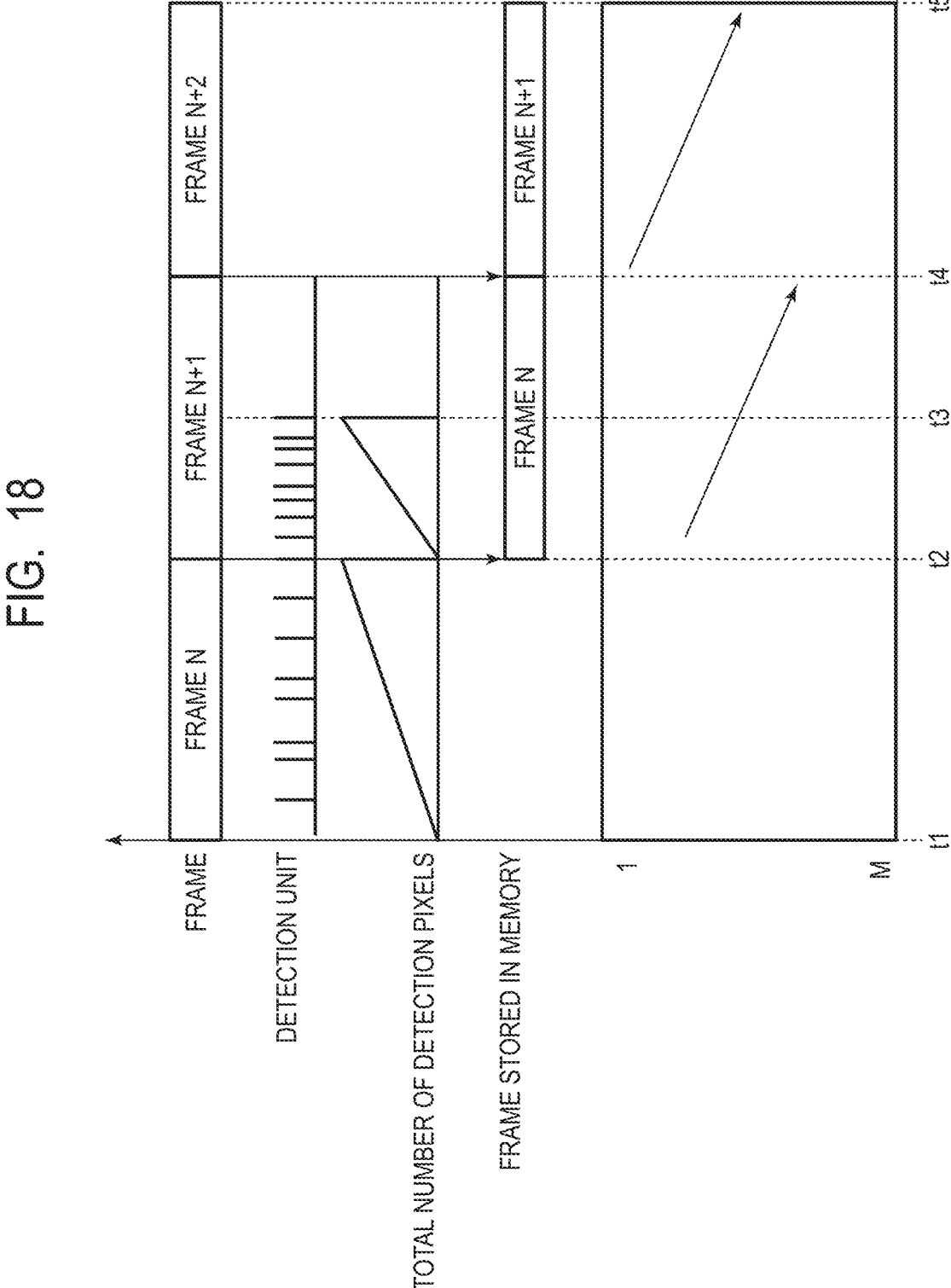
FIG. 18 is a timing chart illustrating an operation example of the photoelectric conversion device according to the third embodiment of the present disclosure.

Next, a photoelectric conversion device 100B according to a third embodiment will be described. In the photoelectric conversion device 100B according to the third embodiment, the same components as those of the first and second embodiments are denoted by the same reference numerals, and detailed description thereof will be omitted. FIG. 15 is a functional block diagram illustrating a configuration example of a main part of the photoelectric conversion device 100B according to the present embodiment. In FIG. 15, as a main part of the photoelectric conversion device 100B, an exposure control unit 83 is further provided in addition to the main part of the photoelectric conversion device 100 illustrated in FIG. 6. FIG. 16 is a block diagram illustrating a configuration example of the pixel 12B of the photoelectric conversion device 100B according to the present embodiment. FIG. 17 is a diagram illustrating an operation example of an edge trigger circuit 39 of the photoelectric conversion device 100B according to the present embodiment. FIG. 18 is a timing chart illustrating an operation example of the photoelectric conversion device 100B according to the present embodiment. The photoelectric conversion device 100B according to the present embodiment is different from the photoelectric conversion devices 100 according to the first and second embodiments in that the number of detection pixels 12a is limited to be constant in order to suppress a decrease in processing speed.

Each pixel 12B according to the present embodiment may include, for example, the quenching element 24, the waveform shaping unit 32, the counter circuit 34, the second switch circuit 362, a third switch circuit 363, a memory 38, and an edge trigger circuit 39.

The second switch circuit 362 is provided on the data line 16 between the counter circuit 34 and the memory 38, and switches an electrical connection state (connection or non-connection) between the counter circuit 34 and the memory 38. The second switch circuit 362 switches the connection state between the counter circuit 34 and the memory 38 in accordance with a control signal supplied from the exposure control unit 83 via the control line 14.

The third switch circuit 363 is provided on the data line 16 between the memory 38 and the readout circuit unit 50, and switches an electrical connection state (connection or non-connection) between the memory 38 and the readout circuit unit 50. The third switch circuit 363 switches the connection state between the memory 38 and the readout circuit unit 50 according to a control signal supplied from the region control unit 82 via the control line 14.

The memory 38 stores data. The memory 38 is connected to the counter circuit 34 via the second switch circuit 362, and stores the count signal output from the counter circuit 34. The memory 38 is connected to the readout circuit unit 50 via the third switch circuit 363, and outputs the stored count signal to the output circuit unit 70 via the readout circuit unit 50.

The edge trigger circuit 39 detects a change in the level of a signal indicating upper bit information (CNT [10]). Here, the edge trigger circuit 39 detects the rise of the pulse signal. The edge trigger circuit 39 is provided on the data line 16 between the counter circuit 34 and the readout circuit unit 50. The edge trigger circuit 39 detects that the pulse signal indicating the upper bit (CNT [10]) of the count signal output from the counter circuit 34 changes from the low level to the high level. That is, the edge trigger circuit 39 detects that the upper bit (CNT [10]) changes from "0" to "1". As illustrated in FIG. 17, for example, the edge trigger circuit 39 takes an exclusive OR (XOR) of a signal (CNT [10]) of an upper bit of the count signal and a delayed signal (CNT [10]_d) obtained by delaying the signal of the upper bit (CNT [10]). Accordingly, the edge trigger circuit 39 detects that the upper bit (CNT [10]) changes from the low level to the high level at time t1, and outputs a detection pulse signal TRG indicating the detection result to the detection unit 81 via the readout circuit unit 50.

The detection unit 81 stores the coordinate position of the detection pixel 12a and counts the total number of the detection pixels 12a based on the detection pulse signal TRG output from the edge trigger circuit 39.

The detection unit 81 includes, for example, a counter circuit 811, and counts the total number of detection pixels 12a by the counter circuit 811. When the count value counted by the counter circuit 811 is equal to or greater than a predetermined threshold value, the detection unit 81 outputs a control signal indicating that the count value is equal to or greater than the threshold value to the exposure control unit 83. When the count value counted by the counter circuit 811 is less than the threshold value, the detection unit 81 does not output the control signal to the exposure control unit 83.

The exposure control unit 83 controls exposure of each pixel 12 for each frame. When the detection unit 81 outputs a control signal indicating that the count value is equal to or greater than the threshold value, that is, the number of detection pixels 12a is equal to or greater than the predetermined reference number of pixels, the exposure control unit 83 outputs a control signal to each pixel 12 via the vertical scanning circuit unit 40. Then, the exposure control unit 83 controls the quenching element 24 based on the control signal, and stops the process of converting the change in the avalanche current by the photoelectric conversion element 22 into the voltage signal. As a result, the count processing by the counter circuit 34 of each pixel 12 is stopped. That is, the exposure of all the pixels 12 in the target frame is stopped in the middle of the exposure period. After stopping the counter circuit 34, the exposure control unit 83 turns on the second switch circuit 362, and causes the memory 38 to store a count signal indicating a count value counted by the counter circuit 34 until before the stop.

When the third switch circuit 363 is turned on by the region control unit 82, the memory 38 outputs the stored count signal to the output circuit unit 70 via the readout circuit unit 50.

Next, an operation example of the photoelectric conversion device 100B will be described with reference to FIG. 18. FIG. 18 is a timing chart illustrating an operation example of the photoelectric conversion device 100B according to the present embodiment. As illustrated in FIG. 18, at time t1, the photoelectric conversion device 100B starts exposure of the frame N.

The edge trigger circuit 39 of each pixel 12 detects that the upper bit (CNT [10]) of the count signal output from the counter circuit 34 changes from the low level to the high level, and outputs a detection pulse signal indicating the detection result to the detection unit 81.

At time t1 to time t2, the counter circuit 811 of the detection unit 81 counts the total number of detection pixels 12a in the frame N based on the detection pulse signal TRG output from the edge trigger circuit 39.

At time t2, when the count value counted by the counter circuit 811 is equal to or greater than the threshold value, the detection unit 81 outputs a control signal indicating that the count value is equal to or greater than the threshold value to the exposure control unit 83. At time t2, when the control signal indicating that the count value is equal to or greater than the threshold value is output from the detection unit 81, the exposure control unit 83 stops exposure by each pixel 12. Then, the exposure control unit 83 stores a count signal indicating the count value counted by the counter circuit 34 of each pixel 12 in the memory 38. At time t2 to time t4, the region control unit 82 outputs the count signal stored in the memory 38 to the output circuit unit 70. After the count signal is output to the memory 38, a reset signal is output from the vertical scanning circuit unit 40, and the counter circuit 34 of each pixel 12 resets the count value.

At time t2, exposure of the next frame N+1 has started. The edge trigger circuit 39 of each pixel 12 detects that the upper bit (CNT [10]) of the count signal output from the counter circuit 34 changes from the low level to the high level, and outputs a detection pulse signal TRG indicating the detection result to the detection unit 81.

At time t2 to time t4, the counter circuit 811 of the detection unit 81 counts the total number of detection pixels 12a in the frame N+1 based on the detection pulse signal output from the edge trigger circuit 39.

At time t3, when the count value of the frame N+1 counted by the counter circuit 811 is equal to or greater than the threshold value, the detection unit 81 outputs a control signal indicating that the count value is equal to or greater than the threshold value to the exposure control unit 83. The time t3 is a time in the middle of the exposure period (time t2 to time t4) in the frame N+1. In the period from the time t2 to the time t3, the total amount of light increases, and the detection pixel 12a in the frame N+1 increases in a shorter period than the detection pixel 12a in the frame N. In this period, the total number of detection pixels 12a in the frame N+1 is equal to or larger than the threshold value in the middle of the exposure period (time t2 to time t4) in the frame N+1. At time t3, when a control signal indicating that the count value is equal to or greater than the threshold value is output from the detection unit 81, the exposure control unit 83 stops the exposure by each pixel 12 of the frame N+1 even in the middle of the exposure period. That is, the counter circuit 34 of each pixel 12 stops. At time t4, after the exposure period of the frame N+1 ends, the exposure control unit 83 stores the count signal indicating the count value counted by the counter circuit 34 of each pixel 12 in the memory 38. At time t4 to time t5, the region control unit 82 outputs the count signal stored in the memory 38 to the output circuit unit 70. After the counter circuit 34 outputs the count signal to the memory 38, a reset signal is output from the vertical scanning circuit unit 40, the counter circuit 34 resets the count value. At time t4, exposure of the next frame N 2 is started, and the same processing as that described above is repeated. Although the counter circuit 34 of each pixel 12 stops at time t3, the counter circuit 34 does not output the count signal of the frame N+1 to the memory 38 until time t4 at which the process of reading the count signal of the frame N stored in the memory 38 ends. At time t4 when the process of reading the count signal of the frame N ends, the count signal of the frame N+1 is output to the memory 38.

As described above, when the number of detection pixels 12a is equal to or larger than the predetermined reference number of pixels from the detection result of the edge trigger circuit 39, the exposure control unit 83 stops exposure of all pixels in the target frame in the middle. The region control unit 82 controls the selection circuit 36 of the detection pixel 12a in the target frame in which the exposure is stopped in the middle, causes the counter circuit 34 of the detection pixel 12a to output all bit information, and the target frame is changed to the next frame. Thus, the exposure period can be optimized for each frame, and the number of detection pixels 12a can be made constant. It becomes possible to prevent an increase in the readout period that would result from an increase in the number of pixels read out from the output circuit unit 70 due to an increase in the number of detection pixels 12a. In addition, by providing the memory 38, it is possible to simultaneously perform the read operation by the detection unit 81 and the output operation of the output circuit unit 70, and it is possible to improve the read speed. In addition, the global shutter operation becomes possible, and by synchronizing with light emission of a laser, an LED, or the like, the influence of external light can be removed, and the output accuracy of the signal can be further improved.

Fourth Embodiment

A light detection system according to a fourth embodiment of the present disclosure will be described with reference to FIG. 19. FIG. 19 is a block diagram illustrating a schematic configuration of a light detection system according to the present embodiment. In the present embodiment, a light detection sensor to which the photoelectric conversion devices 100 according to the first to third embodiments will be described.

The photoelectric conversion device 100 described in the first to third embodiments can be applied to various optical detection systems. Examples of applicable light detection systems include imaging systems such as digital still cameras, digital camcorders, surveillance cameras, copiers, faxes, mobile phones, on-board cameras, observation satellites, and the like. A camera module including an optical system such as a lens and an imaging device is also included in the light detection system. FIG. 13 exemplifies a block diagram of a digital still camera as one of these.

The light detection system 200 illustrated in FIG. 13 includes a photoelectric conversion device 201, a lens 202 that forms an optical image of a subject on the photoelectric conversion device 201, an aperture 204 for varying the amount of light passing through the lens 202, and a barrier 206 for protecting the lens 202. The lens 202 and the aperture 204 are optical systems that focus light onto the photoelectric conversion device 201. The photoelectric conversion device 201 is the photoelectric conversion device 100 described in any of the first to third embodiments, and converts an optical image formed by the lens 202 into image data.

The light detection system 200 further includes a signal processing unit 208 that processes an output signal output from the photoelectric conversion device 201. The signal processing unit 208 generates image data from the digital signal output from the photoelectric conversion device 201.

Further, the signal processing unit 208 performs various corrections and compressions as necessary and outputs image data. The photoelectric conversion device 201 may include an AD conversion unit that generates a digital signal to be processed by the signal processing unit 208. The AD conversion unit may be formed on a semiconductor layer (semiconductor substrate) on which the photon detection element of the photoelectric conversion device 201 is formed, or may be formed on a semiconductor substrate different from the semiconductor layer on which the photon detection element of the photoelectric conversion device 201 is formed. The signal processing unit 208 may be formed on the same semiconductor substrate as the photoelectric conversion device 201.

The light detection system 200 further includes a buffer memory unit 210 for temporarily storing image data, and an external interface unit (external I/F unit) 212 for communicating with an external computer or the like. Further, the light detection system 200 includes a recording medium 214 such as a semiconductor memory for performing recording or reading of imaging data, and a recording medium control interface unit (recording medium control I/F unit) 216 for performing recording or reading on the recording medium 214. The recording medium 214 may be built in the light detection system 200 or may be detachable. Communication between the recording medium control I/F unit 216 and the recording medium 214 and communication from the external I/F unit 212 may be performed wirelessly.

The light detection system 200 further includes an overall control/calculation unit 218 that controls various calculations and the entire digital still camera, and a timing generation unit 220 that outputs various timing signals to the photoelectric conversion device 201 and the signal processing unit 208. Here, the timing signal or the like may be input from the outside, and the light detection system 200 may include at least the photoelectric conversion device 201 and the signal processing unit 208 that processes the output signal output from the photoelectric conversion device 201. The timing generation unit 220 may be mounted on the photoelectric conversion device 201. Further, the overall control/calculation unit 218 and the timing generation unit 220 may be configured to perform a part or all of the control functions of the photoelectric conversion device 201.

The photoelectric conversion device 201 outputs the imaging signal to the signal processing unit 208. The signal processing unit 208 performs predetermined signal processing on the imaging signal output from the photoelectric conversion device 201, and outputs image data. The signal processing unit 208 generates an image using the imaging signal. The signal processing unit 208 may be configured to perform distance measurement calculation on a signal output from the photoelectric conversion device 201.

As described above, according to the present embodiment, by configuring the light detection system using the photoelectric conversion devices according to the first to third embodiments, it is possible to realize the light detection system capable of acquiring a higher quality image.

Fifth Embodiment

A range image sensor according to a fifth embodiment of the present disclosure will be described with reference to FIG. 20. FIG. 20 is a block diagram illustrating a schematic configuration of a range image sensor according to the present embodiment. In the present embodiment, the range image sensor will be described as an example of a light detection system to which the photoelectric conversion device 100 described in the first to third embodiments is applied.

As illustrated in FIGS. 14A and 14B, the range image sensor 300 according to the present embodiment may include an optical system 302, a photoelectric conversion device 304, an image processing circuit 306, a monitor 308, and a memory 310. The range image sensor 300 receives light (modulated light or pulsed light) emitted from the light source device 320 toward the subject 330 and reflected on the surface of the subject 330, and acquires a distance image corresponding to the distance to the subject 330.

The optical system 302 includes one or a plurality of lenses, and forms an image light (incident light) from the subject 330 on a light receiving surface (sensor unit) of the photoelectric conversion device 304.

The photoelectric conversion device 304 is the photoelectric conversion device 100 described in any of the first to third embodiments, and generates a distance signal indicating a distance to the subject 330 based on the image light from the subject 330 and supplies the generated distance signal to the image processing circuit 306.

The image processing circuit 306 performs image processing for constructing the distance image based on the distance signal supplied from the photoelectric conversion device 304.

The monitor 308 displays the distance image (image data) obtained by image processing in the image processing circuit 306. The memory 310 stores (records) the distance image (image data) obtained by image processing in the image processing circuit 306.

As described above, according to the present embodiment, by configuring the range image sensor using the photoelectric conversion devices according to the first to third embodiments, it is possible to realize a range image sensor capable of acquiring a range image including more accurate range information in conjunction with improvement in characteristics of the pixels 12.

Sixth Embodiment

An endoscopic surgery system according to a sixth embodiment of the present disclosure will be described with reference to FIG. 21.

Figure 21:
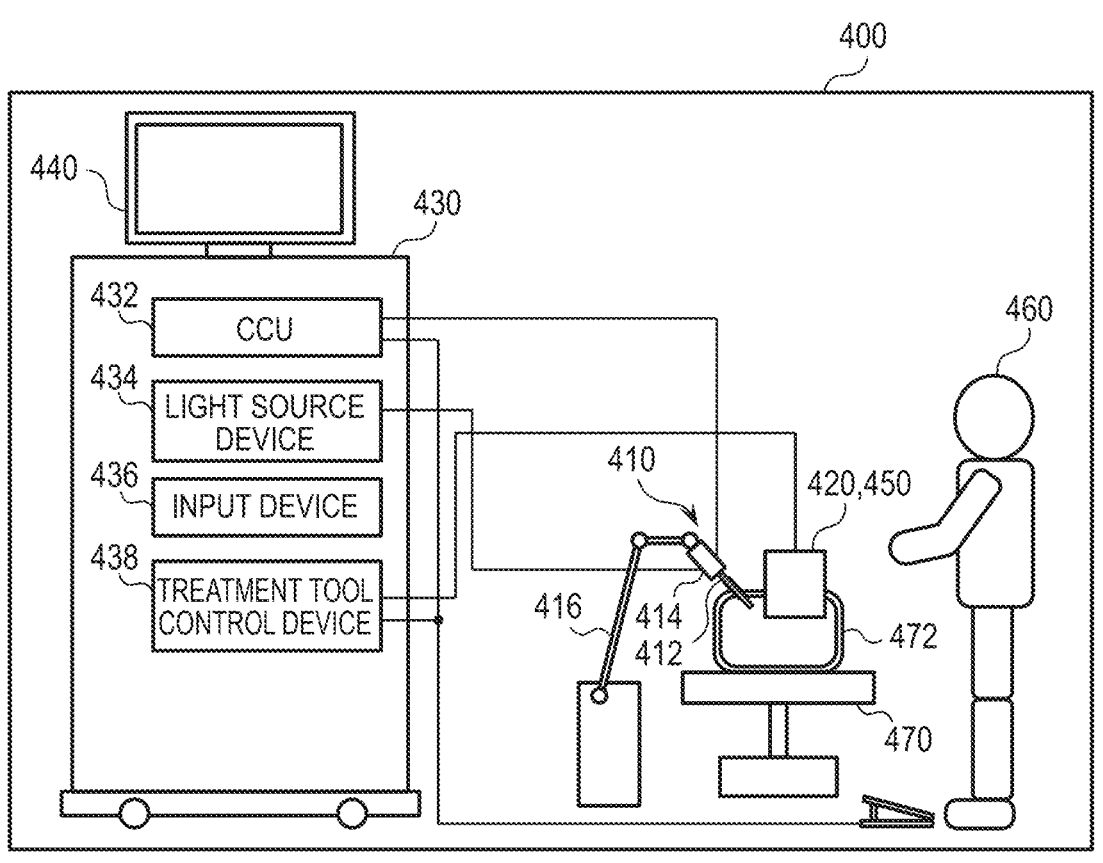
FIG. 21 is a schematic diagram illustrating a configuration example of an endoscopic surgery system according to a sixth embodiment of the present disclosure.

FIG. 21 is a schematic diagram illustrating a configuration example of the endoscopic surgery system according to the present embodiment. In the present embodiment, an endoscopic surgery system will be described as an example of a light detection system to which the photoelectric conversion device 100 described in the first to third embodiments is applied.

FIG. 21 illustrates that an operator (physician) 460 performs surgery on a patient 472 on a patient bed 470 using the endoscopic surgery system 400.

As illustrated in FIG. 21, the endoscopic surgery system 400 of the present embodiment may include an endoscope 410, a surgical tool 420, and a cart 430 on which various devices for endoscopic surgery are mounted. A CCU (Camera Control Unit) 432, a light source device 434, an input device 436, a treatment tool control device 438, a display device 440, and the like can be mounted on the cart 430.

The endoscope 410 includes a lens barrel 412 in which a region of a predetermined length from the distal end is inserted into the body cavity of the patient 472, and a camera head 414 connected to the proximal end of the lens barrel 412. Although FIG. 21 illustrates an endoscope 410 configured as a so-called rigid mirror having a rigid lens barrel 412, the endoscope 410 may be configured as a so-called flexible mirror having a flexible barrel. The endoscope 410 is held movably by an arm 416.

The distal end of the lens barrel 412 is provided with an opening into which the objective lens is fitted. A light source device 434 is connected to the endoscope 410, and light generated by the light source device 434 is guided to the tip of a lens barrel 412 by a light guide extended inside the lens barrel 412, and the light is irradiated toward an observation target in a body cavity of a patient 472 via an objective lens. Note that the endoscope 410 may be a direct-viewing mirror, a perspective-viewing mirror, or a side-viewing mirror.

An optical system and a photoelectric conversion device (not illustrated) are provided inside the camera head 414, and reflected light (observation light) from an observation target is condensed on the photoelectric conversion device by the optical system.

The photoelectric conversion device photoelectrically converts the observation light and generates an electrical signal corresponding to the observation light, that is, an image signal corresponding to the observation image. As the photoelectric conversion device, the photoelectric conversion device 100 described in any of the first to third embodiments can be used. The image signal is transmitted to the CCU 432 as RAW data.

The CCU 432 is configured by a CPU (Central Processing Unit), a GPU (Graphics Processing Unit), or the like, and integrally controls operations of the endoscope 410 and the display device 440. Further, the CCU 432 receives an image signal from the camera head 414, and performs various types of image processing for displaying an image based on the image signal, such as development processing (demosaic processing).

The display device 440 displays an image based on the image signal subjected to the image processing by the CCU 432 under the control of the CCU 432.

The light source device 434 includes, for example, a light source such as an LED (Light Emitting Diode), and supplies irradiation light to the endoscope 410 when photographing a surgical site or the like.

The input device 436 is an input interface to the endoscopic surgery system 400. The user can input various kinds of information and instructions to the endoscopic surgery system 400 via the input device 436.

The treatment tool control device 438 controls the driving of the energy treatment tool 450 for tissue cauterization, incision, sealing of blood vessels, or the like.

The light source device 434 that supplies irradiation light when imaging the surgical site to the endoscope 410 can be configured by, for example, a white light source configured by an LED, a laser light source, or a combination thereof. When the white light source is configured by a combination of the RGB laser light sources, since the output intensity and the output timing of each color (each wavelength) can be controlled with high accuracy, the white balance of the captured image can be adjusted in the light source device 434. In addition, in this case, it is also possible to capture an image corresponding to each of RGB in a time division manner by irradiating the observation target with laser light from each of the RGB laser light sources in a time division manner and controlling driving of the imaging element of the camera head 414 in synchronization with the irradiation timing. According to this method, a color image can be obtained without providing a color filter in the image sensor.

Further, the driving of the light source device 434 may be controlled so as to change the intensity of light to be output every predetermined time. By controlling the driving of the image sensor of the camera head 414 in synchronization with the timing of the change of the intensity of the light to acquire an image in a time-division manner and synthesizing the image, it is possible to generate an image having a high dynamic range free from so-called black blur and white blur.

The light source device 434 may be configured to be capable of supplying light in a predetermined wavelength band corresponding to special light observation. In the special light observation, for example, wavelength dependency of absorption of light in body tissue is utilized. Specifically, a predetermined tissue such as a blood vessel in the superficial layer of a mucous membrane is photographed with high contrast by irradiating light in a narrow band as compared with irradiation light (that is, white light) at the time of normal observation. Alternatively, in the special light observation, fluorescence observation in which an image is obtained by fluorescence generated by irradiation with excitation light may be performed. In the fluorescence observation, a body tissue is irradiated with excitation light to observe fluorescence from the body tissue, or a body tissue is locally injected with reagent such as indocyanine green (ICG), and the body tissue is irradiated with excitation light corresponding to a fluorescence wavelength of the reagent to obtain a fluorescence image. The light source device 434 may be configured to be capable of supplying narrowband light and/or excitation light corresponding to such special light observation.

As described above, according to the present embodiment, by configuring the endoscopic surgical system using the photoelectric conversion devices according to the first to third embodiments, it is possible to realize an endoscopic surgical system capable of acquiring a high quality image.

Seventh Embodiment

Figure 22A:
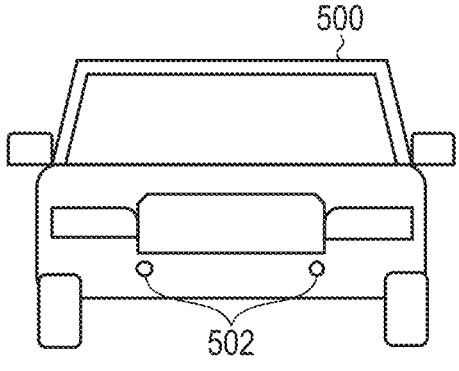
FIGS. 22A, 22B, and 22C are schematic diagrams illustrating configuration examples of a mobile object according to a seventh embodiment of the present disclosure.
Figure 22B:
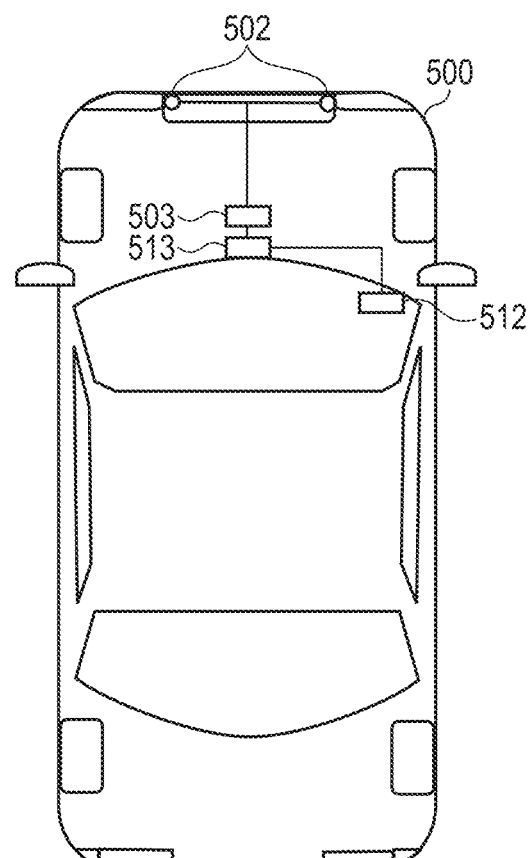
Figure 22C:
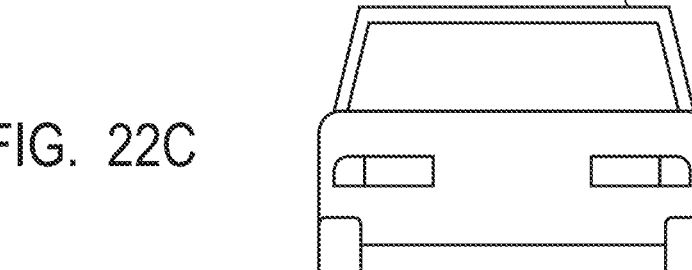
Figure 23:
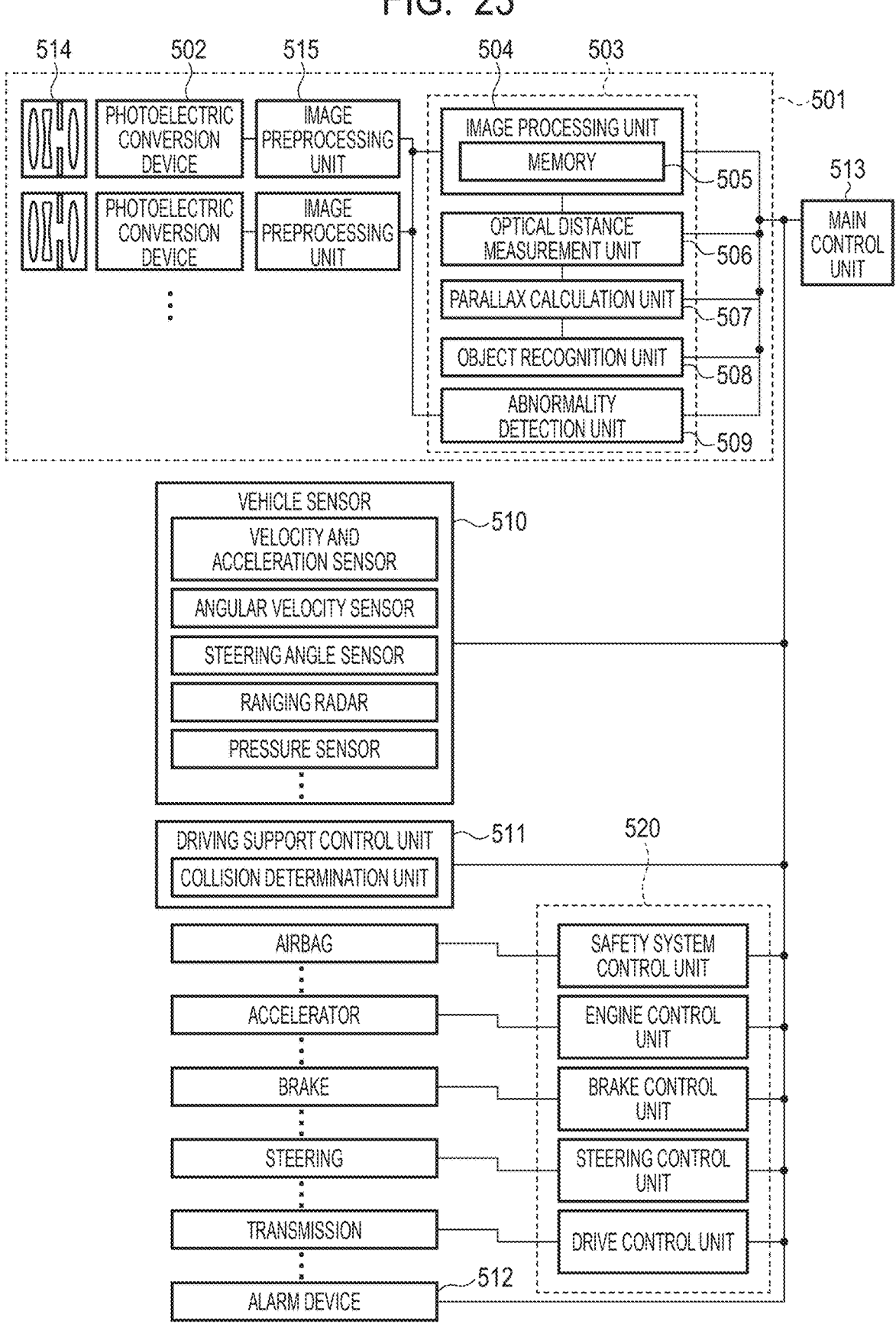
FIG. 23 is a block diagram illustrating a schematic configuration of a light detection system according to the seventh embodiment of the present disclosure.
Figure 24:
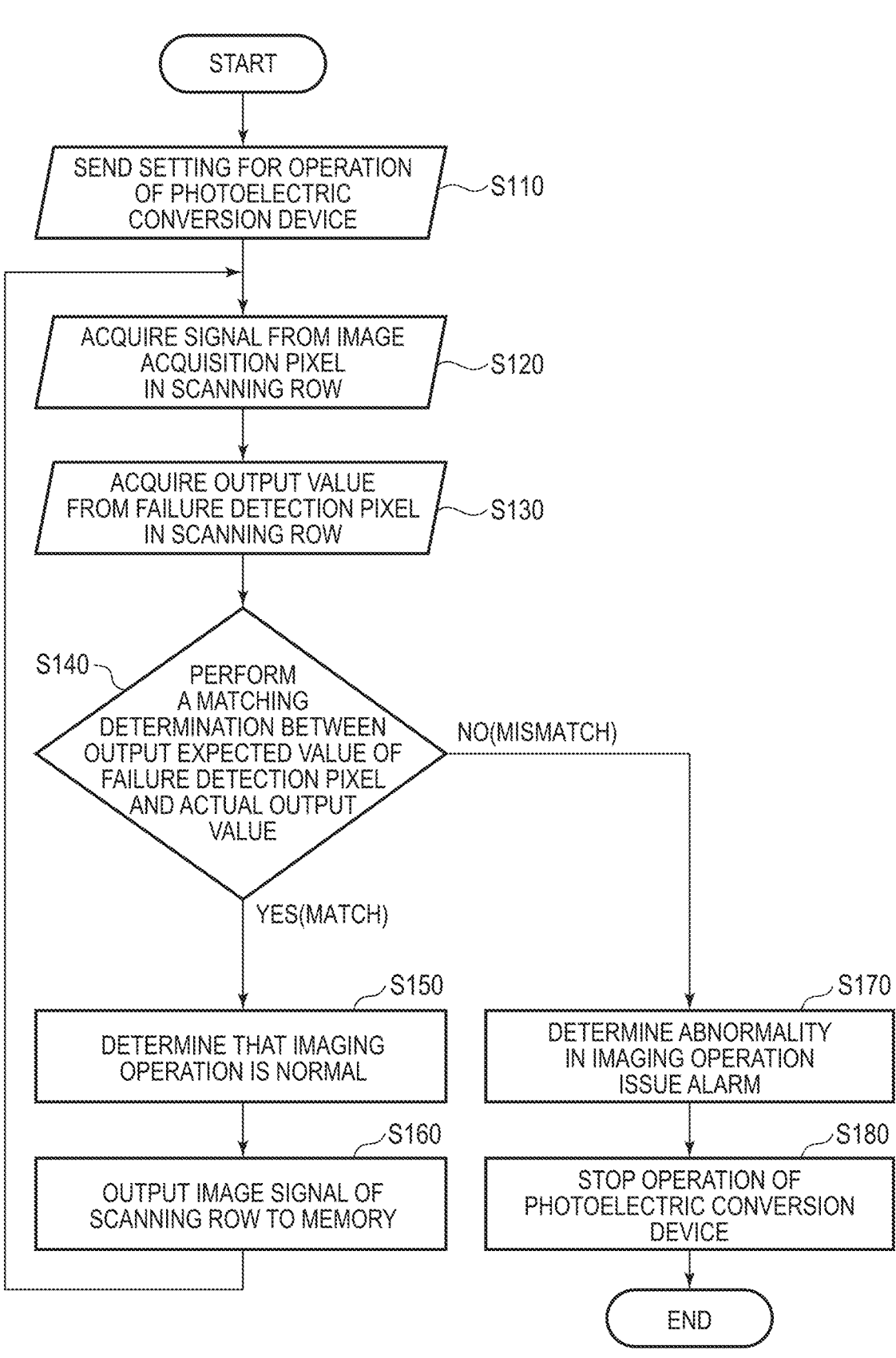
FIG. 24 is a flowchart illustrating an operation of the light detection system according to the seventh embodiment of the present disclosure.

A light detection system and mobile object according to a seventh embodiment of the present disclosure is described with reference to FIGS. 22A to 24. FIGS. 22A to 22C are schematic diagrams illustrating a configuration example of mobile object according to the present embodiment. FIG. 23 is a block diagram illustrating a schematic configuration of a light detection system according to the present embodiment. FIG. 24 is a flowchart illustrating the operation of the light detection system according to the present embodiment. In the present embodiment, an application example to an in-vehicle camera will be described as a light detection system to which the photoelectric conversion device 100 described in the first to third embodiments is applied.

FIGS. 22A to 22C are schematic diagrams illustrating a configuration example of mobile object (vehicle system) according to the present embodiment. FIGS. 22A to 22C illustrate a configuration of a vehicle 500 (automobile) as an example of a vehicle system incorporating a light detection system to which the photoelectric conversion devices described in the first to third embodiments is applied. FIG. 22A is a schematic front view of the vehicle 500, FIG. 22B is a schematic plan view of the vehicle 500, and FIG. 22C is a schematic rear view of the vehicle 500. The vehicle 500 includes a pair of photoelectric conversion devices 502 on a front surface thereof. Here, the photoelectric conversion device 502 is the photoelectric conversion device 100 described in any of the first to third embodiments. The vehicle 500 includes an integrated circuit 503, an alarm device 512, and a main control unit 513.

FIG. 23 is a block diagram illustrating a configuration example of the light detection system 501 mounted on the vehicle 500. The light detection system 501 includes a photoelectric conversion device 502, an image preprocessing unit 515, an integrated circuit 503, and an optical system 514. The photoelectric conversion device 502 is the photoelectric conversion device 100 described in the first embodiment. The optical system 514 forms an optical image of a subject on the photoelectric conversion device 502. The photoelectric conversion device 502 converts the optical image of the subject formed by the optical system 514 into an electrical signal. The image preprocessing unit 515 performs predetermined signal processing on the signal output from the photoelectric conversion device 502. The function of the image preprocessing unit 515 may be incorporated in the photoelectric conversion device 502. At least two sets of the optical system 514, the photoelectric conversion device 502, and the image preprocessing unit 515 are provided in the light detection system 501, and an output from the image preprocessing unit 515 of each set is input to the integrated circuit 503.

The integrated circuit 503 is an integrated circuit for an imaging system application, and includes an image processing unit 504, an optical distance measurement unit 506, a parallax calculation unit 507, an object recognition unit 508, and an abnormality detection unit 509. The image processing unit 504 processes the image signal output from the image preprocessing unit 515. For example, the image processing unit 504 performs image processing such as development processing and defect correction on the output signal of the image preprocessing unit 515. The image processing unit 504 includes a memory 505 that temporarily holds an image signal. In the memory 505, for example, the position of a known defective pixel in the photoelectric conversion device 502 may be stored.

The optical distance measurement unit 506 performs focusing and distance measurement of a subject. The parallax calculation unit 507 calculates distance measurement information (distance information) from a plurality of pieces of image data (parallax images) acquired by the photoelectric conversion devices 502. Each of the photoelectric conversion devices 502 may have a configuration capable of acquiring various kinds of information such as distance information. The object recognition unit 508 recognizes a subject such as a vehicle, a road, a sign, or a person.

Upon detecting an abnormality in the photoelectric conversion device 502, the abnormality detection unit 509 notifies the main control unit 513 of the abnormality.

The integrated circuit 503 may be realized by dedicatedly designed hardware, may be realized by a software module, or may be realized by a combination thereof. Further, it may be realized by FPGA (Field Programmable Gate Array), ASIC (Application Specific Integrated Circuit), or the like, or may be realized by a combination thereof.

The main control unit 513 integrally controls the operations of the light detection system 501, the vehicle sensor 510, the control unit 520, and the like. The vehicle 500 may not include the main control unit 513.

In this case, the photoelectric conversion device 502, the vehicle sensor 510, and the control unit 520 transmit and receive control signals via a communication network. For example, the CAN standard may be applied to the transmission and reception of the control signal.

The integrated circuit 503 transmits a control signal or a set value to the photoelectric conversion device 502 by receiving a control signal from the main control unit 513 or by its own control unit.

The light detection system 501 is connected to the vehicle sensor 510 and can detect a traveling state of the host vehicle such as a vehicle speed, a yaw rate, and a steering angle, an environment outside the host vehicle, and states of other vehicles and obstacles.

The vehicle sensor 510 is also a distance information acquisition unit that acquires distance information to an object. In addition, the light detection system 501 is connected to a driving support control unit 511 that performs various kinds of driving support such as automatic steering, automatic traveling, and a collision prevention function. In particular, with respect to the collision determination function, based on the detection results from the light detection system 501 and the vehicle sensor 510, the collision estimation or the presence/absence of collision with other vehicles and obstacles is determined. Thus, avoidance control when a collision is estimated and activation of the safety device at the time of the collision are performed.

The light detection system 501 is also connected to an alarm device 512 that issues an alarm to the driver based on the determination result of the collision determination unit. For example, when the determination result of the collision determination unit is that the possibility of a collision is high, the main control unit 513 performs vehicle control for avoiding a collision and reducing damage by applying a brake, returning an accelerator, suppressing engine output, or the like. The alarm device 512 alerts the user by sounding an alarm such as a sound, displaying alarm information on a display screen of a car navigation system, a meter panel, or the like, or vibrating a seat belt or a steering wheel.

In the present embodiment, an image of the surroundings of the vehicle, for example, the front or the rear, is captured by the light detection system 501. FIG. 22B illustrates an arrangement example of the light detection system 501 in a case where the light detection system 501 images the front of the vehicle.

As described above, the photoelectric conversion device 502 is disposed in front of the vehicle 500. Specifically, it is preferable that a center line with respect to an advancing/retreating direction or an outer shape (for example, a vehicle width) of the vehicle 500 is regarded as a symmetry axis, and two photoelectric conversion devices 502 are disposed line-symmetrically with respect to the symmetry axis in order to acquire distance information between the vehicle 500 and an object to be imaged and determine a possibility of collision. In addition, the photoelectric conversion device 502 is preferably disposed so as not to interfere with the driver's visual field when the driver visually recognizes a situation outside the vehicle 500 from the driver's seat. The alarm device 512 is preferably disposed so as to easily enter the field of view of the driver.

Next, a failure detection operation of the photoelectric conversion device 502 in the light detection system 501 will be described with reference to FIG. 24. The failure detection operation of the photoelectric conversion device 502 may be performed in accordance with steps S110 to S180 illustrated in FIG. 24.

Step S110 is a step of performing setting at the start-up of the photoelectric conversion device 502. That is, the setting for the operation of the photoelectric conversion device 502 is transmitted from the outside of the light detection system 501 (for example, the main control unit 513) or the inside of the light detection system 501, and the imaging operation and the failure detection operation of the photoelectric conversion device 502 are started.

Next, in step S120, pixel signals are acquired from the effective pixels. In step S130, an output value from a failure detection pixel provided for failure detection is acquired. The failure detection pixel includes a photoelectric conversion element in the same manner as the effective pixel. A predetermined voltage is written to the photoelectric conversion element. The failure detection pixel outputs a signal corresponding to the voltage written in the photoelectric conversion element. Note that step S120 and step S130 may be reversed.

Next, in step S140, a matching determination is performed between the output expected value of the failure detection pixel and the output value from the actual failure detection pixel. As a result of the matching determination in step S140, if the output expected value matches the actual output value, the process proceeds to step S150, it is determined that the imaging operation is normally performed, and the process step proceeds to step S160. In step S160, the pixel signal of the scanning row is transmitted to the memory 505 and temporarily stored. After that, the process returns to step S120 to continue the failure detection operation. On the other hand, as a result of the matching determination in step S140, if the output expectation value does not coincide with the actual output value, the process proceeds to step S170. In step S170, it is determined that there is an abnormality in the imaging operation, and an alarm is notified to the main control unit 513 or the alarm device 512. The alarm device 512 causes the display unit to display that an abnormality has been detected. Thereafter, in step S180, the photoelectric conversion device 502 is stopped, and the operation of the light detection system 501 is ended.

In addition, in the present embodiment, an example in which the flowchart is looped for each row is illustrated, but the flowchart may be looped for each plurality of rows, or the failure detection operation may be performed for each frame. The alarm of step S170 may be notified to the outside of the vehicle via a wireless network.

In addition, in the present embodiment, the control in which the vehicle does not collide with another vehicle has been described, but the present invention is also applicable to control in which the vehicle follows another vehicle and performs automatic driving, control in which the vehicle performs automatic driving so as not to protrude from a lane, and the like. Further, the light detection system 501 is not limited to a vehicle such as an own vehicle, and can be applied to, for example, mobile object (mobile device) of a ship, an aircraft, an industrial robot, or the like. In addition, the present invention is not limited to mobile object, and can be widely applied to devices using object recognition, such as an intelligent traffic system (ITS).

Eighth Embodiment

Figure 25A:
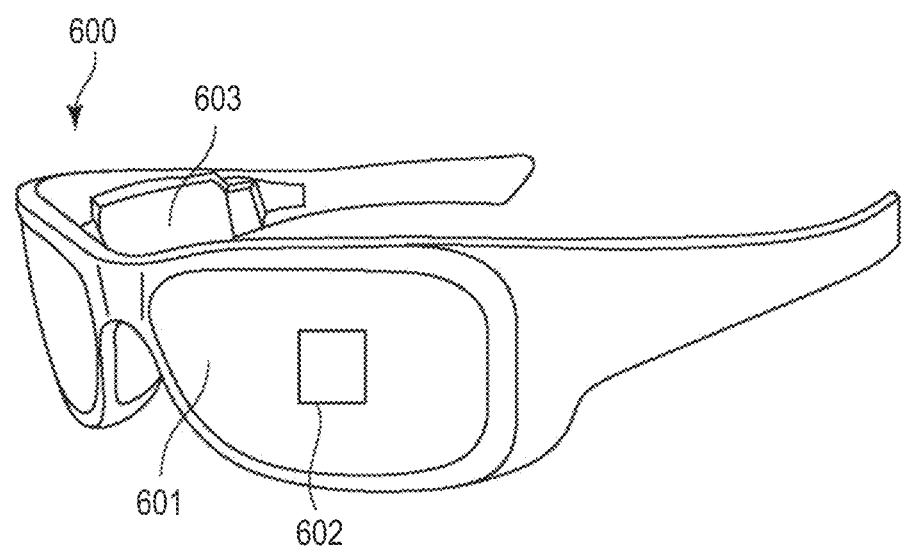
FIGS. 25A and 25B are schematic diagrams illustrating a schematic configuration of a light detection system according to an eighth embodiment of the present disclosure.
Figure 25B:
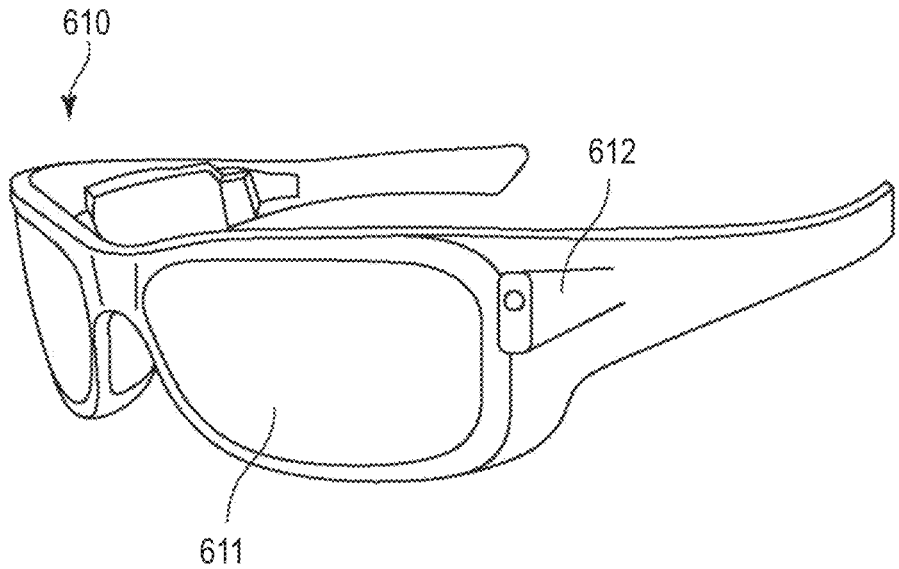

A light detection system according to an eighth embodiment of the present disclosure will be described with reference to FIGS. 25A and 25B. FIGS. 25A and 25B are schematic diagrams illustrating a configuration example of the light detection system according to the present embodiment. In the present embodiment, an application example to glasses (smart glasses) will be described as a light detection system to which the photoelectric conversion device 100 described in the first to third embodiments is applied.

FIG. 25A illustrates glasses 600 (smart glasses) according to one application example. The eyeglasses 600 include a lens 601, a photoelectric conversion device 602, and a control device 603.

The photoelectric conversion device 602 is the photoelectric conversion device 100 described in any of the first to third embodiments and is provided in the lens 601. One photoelectric conversion device 602 may be provided, or a plurality of photoelectric conversion devices 602 may be provided. When the photoelectric conversion devices 602 are used, a combination of a plurality of types of photoelectric conversion devices 602 may be used. The arrangement position of the photoelectric conversion device 602 is not limited to FIG. 25A. A display device (not illustrated) including a light emitting device such as an OLED or an LED may be provided on the back surface side of the lens 601.

The control device 603 functions as a power supply that supplies power to the photoelectric conversion device 602 and the display device. The control device 603 controls the operation of the photoelectric conversion device 602 and the display device. The lens 601 is provided with an optical system for focusing light on the photoelectric conversion device 602.

FIG. 25B illustrates glasses 610 (smart glasses) according to another application example. The eyeglasses 610 include a lens 611 and a control device 612. A photoelectric conversion device (not illustrated) corresponding to the photoelectric conversion device 602 and a display device may be mounted on the control device 612.

The lens 611 is provided with a photoelectric conversion device in the control device 612 and an optical system for projecting light from the display device, and an image is projected. The control device 612 functions as a power supply that supplies power to the photoelectric conversion device and the display device, and controls operations of the photoelectric conversion device and the display device.

The control device 612 may further include an eye tracking unit that detects the eye direction of the wearer. In this case, an infrared light-emitting portion is provided in the control device 612, and infrared light emitted from the infrared light-emitting portion can be used for detection of the eye direction. Specifically, the infrared light emitting unit emits infrared light to the eyeball of the user who is gazing at the display image. A captured image of the eyeball is obtained by detecting reflected light of the emitted infrared light from the eyeball by an imaging unit having a light receiving element. By providing the reduction unit that reduces light from the infrared light emitting unit to the display unit in a plan view, it is possible to reduce degradation of image quality.

The eye direction of the user with respect to the display image can be detected from the captured image of the eyeball obtained by capturing the infrared light. Any known technique can be applied to the eye tracking using the captured image of the eyeball. As an example, an eye tracking method based on a Purkinje image due to reflection of irradiation light on the cornea can be used. More specifically, the eye direction process based on the pupillary corneal reflection method is performed. The eye direction of the user is detected by calculating an eye direction vector representing the orientation (rotation angle) of the eyeball based on the image of the pupil included in the captured image of the eyeball and the Purkinje image using the pupillary corneal reflection method.

The display device according to the present embodiment may include a photoelectric conversion device having a light receiving element, and may be configured to control a display image based on eye direction information of a user from the photoelectric conversion device. Specifically, the display device determines, based on the eye direction information, a first field-of-view region that the user gazes at and a second field-of-view region other than the first field-of-view region. The first field-of-view region and the second field-of-view region may be determined by a control device of the display device, or may be determined by an external control device. When the determination is made by the external control device, the determination result is transmitted to the display device via communication. In the display region of the display device, the display resolution of the first field-of-view region may be controlled to be higher than the display resolution of the second field-of-view region. That is, the resolution of the second field-of-view region may be lower than the resolution of the first field-of-view region.

The display region may include a first display region and a second display region different from the first display region, and a region having a high priority may be determined from the first display region and the second display region based on the eye direction information. The first display region and the second display region may be determined by a control device of the display device or may be determined by an external control device. When the determination is made by the external control device, the determination result is transmitted to the display device via communication. The resolution of the high priority region may be controlled to be higher than the resolution of the region other than the high priority region. That is, the resolution of the region having a relatively low priority may be lowered.

Note that the AI may be used to determine the first visibility region or the region with a high priority. The AI may be a model configured to estimate the angle of the eye direction and the distance to the target object ahead of the eye direction from the image of the eyeball using the image of the eyeball and the direction in which the eyeball of the image is actually viewed as teacher data. The AI program may be included in the display device, the photoelectric conversion device, or the external device. When the external device has the AI program, the AI program is transmitted to the display device via communication.

In the case of performing display control based on visual recognition detection, the present invention can be preferably applied to smart glasses further including a photoelectric conversion device that captures an image of the outside. The smart glasses can display captured external information in real time.

Modified Embodiments

The present disclosure is not limited to the above embodiment, and various modifications are possible. For example, an example in which a part of the configuration of any of the embodiments is added to another embodiment or an example in which a part of the configuration of another embodiment is replaced with another embodiment is also an embodiment of the present disclosure.

Further, the circuit configuration of the pixel 12 is not limited to the above-described embodiment. For example, a switch such as a transistor may be provided between the photoelectric conversion element 22 and the quenching element 24 or between the photoelectric conversion unit 20 and the pixel signal processing unit 30 (waveform shaping unit 32) to control the electrical connection state therebetween. Further, a switch such as a transistor may be provided between the node to which the voltage VH is supplied and the quenching element 24 and/or between the node to which the voltage VL is supplied and the photoelectric conversion element 22 to control an electrical connection state therebetween.

In the above embodiment, the counter circuit 34 is used as the pixel signal processing unit 30, but a TDC (Time to Digital Converter) and a memory may be used instead of the counter circuit 34. In this case, the generation timing of the pulse signal output from the waveform shaping unit 32 is converted into a digital signal by the TDC. A control pulse pREF (reference signal) is supplied to the TDC from the vertical scanning circuit unit 40 via the control line 14 when the timing of the pulse signal is measured. The TDC acquires, as a digital signal, a signal when an input timing of a signal output from each pixel 12 is set to a relative time with reference to the control pulse pREF.

In addition, although a configuration in which one pixel 12 includes one photoelectric conversion element 22 has been described in the above embodiment, one pixel 12 may include a plurality of photoelectric conversion elements 22.

In addition, although an example in which all bit information (CNT [10:0]) are used as the second information has been described, the second information may not necessarily include all bit information (CNT [10:0]). The second information may include, for example, upper bit information and other bit information among the predetermined number of bits.

It should be noted that the above-described embodiments are merely specific examples for implementing the present disclosure, and the technical scope of the present disclosure should not be interpreted in a limited manner by these embodiments. That is, the present disclosure can be implemented in various forms without departing from the technical idea or the main feature thereof.

According to the embodiments of the present disclosure, it is possible to realize a photoelectric conversion device and a light detection system capable of improving readout speed without lowering output accuracy of a signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-000747, filed Jan. 5, 2024, which is hereby incorporated by reference herein in its entirety.

What is claimed is:

1. A photoelectric conversion device comprising:
a plurality of pixels each including a photoelectric conversion unit configured to output a photon detection signal according to incidence of a photon, a counting unit configured to hold a count value obtained by counting the photon detection signal in a predetermined number of bits, and a switching unit configured to switch information output from the counting unit to first information including information of an upper bit or second information including information of the upper bit and another bit among the predetermined number of bits held by the counting unit;
a detection unit configured to extract a detection pixel that outputs the second information from among the plurality of pixels based on the first information; and
a region control unit configured to control the switching unit of each pixel based on a detection result from the detection unit,
wherein the region control unit causes the counting unit of the detection pixel and an adjacent pixel adjacent to the detection pixel to output the second information.

2. The photoelectric conversion device according to claim 1, wherein the detection unit extracts the pixel as the detection pixel when the first information is at a first logical value and does not extract the pixel as the detection pixel when the first information is at a second logical value.

3. The photoelectric conversion device according to claim 1, wherein the region control unit controls the switching unit of the detection pixel and causes the counting unit of the detection pixel to output the second information, wherein among non-detection pixels which are not extracted by the detection unit, the region control unit specifies the non-detection pixel located within a predetermined distance from the detection pixel as the adjacent pixel, and wherein the region control unit controls the switching unit of the adjacent pixel and causes the counting unit of the adjacent pixel to output the second information.

4. The photoelectric conversion device according to claim 3, wherein the region control unit specifies the non-detection pixels surrounding one detection pixel as the adjacent pixels.

5. The photoelectric conversion device according to claim 4, wherein the plurality of pixels are arranged on XY coordinates having an X axis and a Y axis orthogonal to each other, and wherein the plurality of adjacent pixels surrounding one detection pixel are formed in a rectangular shape in which at least three adjacent pixels are arranged in the X-axis direction and at least three adjacent pixels are arranged in the Y-axis direction.

6. The photoelectric conversion device according to claim 3, wherein the region control unit specifies the non-detection pixel included in a region having a plurality of the detection pixels as the adjacent pixel.

7. The photoelectric conversion device according to claim 3, wherein the region control unit causes the number of bits of the second information output from the counting unit to be different between the detection pixel extracted by the detection unit and the non-detection pixel which is not extracted by the detection unit.

8. The photoelectric conversion device according to claim 7, wherein when the second information is output from the counting unit of the detection pixel, the region control unit causes the counting unit to output remaining bit information excluding lower bit information from the second information.

9. The photoelectric conversion device according to claim 7, wherein when the second information is output from the counting unit of the non-detection pixel, the region control unit causes the counting unit to output remaining bit information excluding the first information from the second information.

10. The photoelectric conversion device according to claim 1, wherein the region control unit controls an exposure period of the photoelectric conversion unit according to the number of the detection pixels.

11. The photoelectric conversion device according to claim 1, further comprising an exposure control unit configured to control exposure of each pixel for each frame, wherein each of the plurality of pixels includes an edge trigger circuit configured to detect a change in a level of a signal indicating the first information, wherein when the number of the detection pixels is equal to or larger than a predetermined reference number of pixels from a detection result by the edge trigger circuit, the exposure control unit stops the exposure of all pixels in a target frame in the middle of the exposure period, wherein the region control unit controls the switching unit of the detection pixel in the target frame in which the exposure is stopped in the middle of the exposure period and causes the counting unit of the detection pixel to output the second information, and wherein the target frame is changed to a next frame.

12. The photoelectric conversion device according to claim 1, wherein the second information includes information of all bits of the predetermined number of bits.

13. A light detection system comprising:

the photoelectric conversion device according to claim 1; and, a signal processing device configured to process a signal output from the photoelectric conversion device.

14. The light detection system according to claim 13, wherein the signal processing device generates a distance image indicating distance information to an object based on the signal.

15. A movable object comprising:

the photoelectric conversion device according to claim 1;

a distance information acquisition unit configured to acquire distance information to an object from a parallax image based on a signal from the photoelectric conversion device; and a control unit configured to control the movable object based on the distance information.

* * * * *